United States Patent [19]

Gray

[11] 3,905,018

[45] Sept. 9, 1975

[54] BINARY IMAGE PROCESSOR

[75] Inventor: Stephen B. Gray, Santa Monica, Calif.

[73] Assignee: Information International, Inc., Culver City, Calif.

[22] Filed: Sept. 15, 1972

[21] Appl. No.: 289,326

Related U.S. Application Data

[63] Continuation-in-part of Ser. No. 48,124, June 22, 1970, Pat. No. 3,706,071.

[52] U.S. Cl. .................... 340/146.3 MA; 340/146.2; 340/146.3 Q

[51] Int. Cl. .................... G06k 9/08

[58] Field of Search .......... 340/146.3 MA, 146.3 H, 340/146.3 Q, 146.3 AQ, 146.2; 235/177

[56] References Cited

UNITED STATES PATENTS

| | | | |
|---|---|---|---|
| 3,152,318 | 10/1964 | Swift, Jr. | 340/146.3 MA |
| 3,339,179 | 8/1967 | Shelton, Jr. et al. | 340/146.3 H |
| 3,384,875 | 5/1968 | Bene et al. | 340/146.3 MA |
| 3,434,109 | 3/1969 | Coote | 340/146.2 |
| 3,573,730 | 4/1971 | Andrews et al. | 340/146.3 Q |
| 3,576,534 | 4/1971 | Steinberger | 340/146.3 MA |
| 3,706,071 | 12/1972 | Gray | 340/146.3 Q |

*Primary Examiner*—Gareth D. Shaw
*Assistant Examiner*—Leo H. Boudreau
*Attorney, Agent, or Firm*—Lindenberg, Freilich, Wasserman, Rosen & Fernandez

[57] ABSTRACT

An image processing system including a stored program processor especially suited for manipulating two dimensional binary data arrays, each array, for example, representative of an image, for the purposes of measuring basic geometric properties of the arrays, cross-correlating two arrays, and creating new arrays as a function of one or two other arrays. The image processor preferably operates in conjunction with a general purpose central processor unit (CPU) including a random access memory which provides the image processor with both the image data arrays and program commands defining the particular image process or operations to be performed with respect to the data arrays. The defined image process normally involves accessing one or two data arrays from sequential locations in the CPU memory. As the data arrays are being accessed, they are being operated upon to, for example, create a third data array as a function of the first two data arrays, the third data array being stored back into the CPU memory. Concurrently, the three arrays can be measured in various manners with the measurements also being stored in the CPU memory. Means are provided for concurrently performing an additional major processing function involving correlation between the first and second data arrays to, for example, determine the shape similarity and relative positional offset therebetween. Additionally, the image processor is also concurrently able to analyze or measure the third image formed as function of the first two images.

9 Claims, 18 Drawing Figures

BINARY IMAGE PROCESSOR

RELATED APPLICATIONS

This application is a continuation in part of U.S. Application, Ser. No. 48,124 filed June 22, 1970 by Stephen B. Gray, entitled "Binary Image Processor", now U.S. Pat. No. 3,706,071.

BACKGROUND OF THE INVENTION

This invention relates to apparatus for processing arrays of numbers for various purposes such as pattern recognition and classification.

Many types of array transformations have been suggested in the image processing literature. Among these are:

1. The fully parallel machine, operating simultaneously on every cell in a two-dimensional array. One of the first such suggestions in the image processing field was by Unger[1]; this line of reasoning led to the development of a powerful parallel array processor, the Pattern Articulation Unit of Illiac III[2]. The fully parallel array transformation has been the dominant model in the field of abstract cellular automata for many years[3,4].

[1] S. H. Unger, A computer oriented toward spatial problems, Proc. IRE, col 46, pp. 1744–1750 (1958).
[2] B. H. McCormick, The Illinois pattern recognition computer-Illiac III, IEEE Trans. Computers, December 1963.
[3] A. W. Burks, Essays in cellular automata, Urbana: Univ. of Ill. Press (1970).
[4] E. R. Banks, Information processing and transmission in cellular automata, Ph.D. thesis, Dept. Mech. Eng., MIT (1/15/71).

2. The inherently sequential machine, which raster-scans through an array, examining one cell and its eight immediate neighbors per unit of time. In this machine, as suggested by Rosenfeld and Pfaltz[5], four of the eight neighbors can be points in the new, or output, image currently being created. This recursive or cumulative capability makes possible operations which cannot easily be done on a parallel device.

[5] A. Rosenfeld and J. Pfaltz, Sequential operations in picture processing, J. ACM, vol 13, October 1966 p. 475.

3. Machines which are conceptually parallel but sequential in implementation. The Golay Logic Processor[6,7,8] performs such transformations at about one cell per microsecond. Sequential implementation, of course, trades processing speed for hardware simplicity.

[6] M. Ingram and K. Preston Jr., Automatic analysis of blood cells, Scientific American, November 1971, p. 75.
[7] M. J. E. Golay, Hexagonal parallel pattern transformations, IEEE Trans. Computers, vol. c-18, August 1969.
[8] K. Preston, Feature extraction by Golay hexagonal pattern transforms, IEEE. Trans. Comp., Vol. c-20, No. 4 (September 1971).

SUMMARY OF THE INVENTION

An image processor system is provided in accordance with the present invention for manipulating arrays of numbers in a highly flexible manner by responding to a program or command string stored in a digital memory. In accordance with the preferred embodiments of the invention, the system employs an image processor and a general purpose computer or central processing unit (CPU) whose main memory is used to store the image processor command string. Briefly, in operation, the image processor executes a command string after being given an initial command location and start signal by the CPU. A typical command causes the image processor to fetch several hundred bits of detailed control data or parameters; following this, the image process itself is started, based on the fetched parameters.

During the image process, one or two data arrays, respectively denoted the unknown (U) and mask (M) are accessed from sequential locations in the main memory, while an output data array, denoted the result (R) can be generated as a function of U and M and stored back into memory. At the same time, the three arrays U, M, and R can be measured in various manners and when the image process is complete, the measurements can be stored in memory by execution of another processor command. The image process consists of a further major function which involves correlating the U and M arrays. For example, correlation can be performed based on a square 3 × 3 neighborhood of relative offsets of the U array with respect to the M array. The image process further consists of an analysis or measurement of the R array generated as a function of U and M. The analysis of the R array can, for example, be based on a scanning 2 × 2 window. All of the image process functions can be performed concurrently.

In accordance with preferred embodiments of the image processor, a series of at least three unknown image data registers are provided for holding portions of the unknown data array respectively corresponding to successive lines spaced along one axis, e.g., the horizontal axis of the data array. The registers include means for scanning, in successive blocks along the second, or vertical axis, the data held in the registers. The blocks preferably extend at least three bits along each axis with each successive block scan being shifted from the preceeding block by one bit so that there is a substantial overlapping of blocks. In accordance with one aspect of the invention, the apparatus includes a known image data register for holding known or mask data, corresponding in location within the respective image to a line of unknown data held in one of the unknown data registers. The known data register is scannable like the unknown data registers.

In accordance with a further aspect of the invention, means are provided for generating a plurality of correlation signals, one for each bit position within a scanned block of unknown data. Each correlation signal is a preselectable logic function of the respective bit of the unknown data in the scanned block and a single bit of the known image data corresponding to the particular block position. A counter is driven by each of the correlation signals and thus the counts, accumulated by the counters as an array of unknown data is scanned, provide indications of the degree of similarity between the known and unknown images for various shifted positions.

In accordance with a still further aspect of the invention, the various bits in the block of unknown data are combined with each other and, in certain instances, with various control parameter bits and known image bits according to preselectable logic functions so as to obtain a result image signal and each result bit thereby obtained is entered into a result image data register at a location corresponding to the location of the scanned block within the unknown data. By storing in memory successively generated lines of result data, an array of data is built up in the memory representing a result image which is a preselected logical modification of the unknown image.

The apparatus may also include a second result image data register for holding a previously generated line of result data. The data in the two result data registers can be scanned in blocks extending two bits along each array axis. Means are provided for generating a plurality of result image characteristic signals, each of which indicates the presence of a respective class of data pattern in the scanned block of result data. Respective counters driven by each of the result image characteristic signals provide accumulated counts which provide an indication of the character of the result image as it is generated and thus also of the unknown image in relation to the known or mask image.

The aforedescribed processor apparatus can, in a first embodiment, be implemented utilizing shift registers so that the data within the unknown data registers and the mask register are shifted out concurrently for comparison, with generated result bits being shifted into the result data register. Alternatively, the data registers can comprise static registers with scanning logic being provided to enable any defined portion of the register length to be scanned for processing. Utilization of static registers together with scanning logic generally provides greater flexibility than the shift registers inasmuch as smaller image patterns can be processed in a shorter time.

DESCRIPTION OF THE PREFERRED EMBODIMENTS

Figure 1:
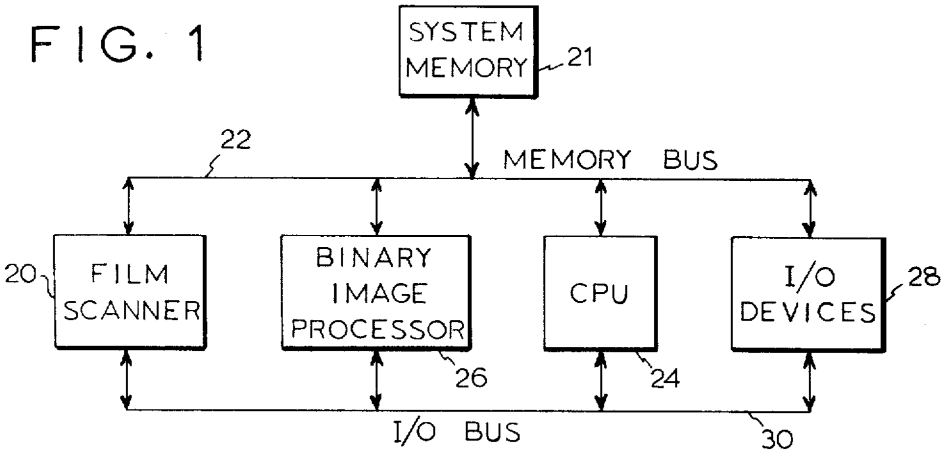
FIG. 1 is a block diagram of an image processing system in accordance with the present invention.

Attention is now called to FIG. 1 which illustrates an image processing system incorporating a binary image processor in accordance with the present invention. The image processing system of FIG. 1 is useful for performing a wide variety of image processing functions such as character recognition, mark sense reading, waveform digitizing, biomedical image interpretation, recognition and classification of fingerprints, etc. As will be seen hereinafter, the system of FIG. 1 is highly versatile in its image processing capability, primarily as a consequence of being responsive to a stored program as contrasted to being hard wired for particular applications.

The system of FIG. 1 includes a transducer, such as film scanner 20, responsive to analog input data representative of an image, for producing digital output data, representative of that same image. More particularly, the film scanner 20, preferably comprises a high precision transducer which converts film densities into digital data which can be stored in a digital memory 21 via a memory bus 22. The memory 21 can, in a preferred embodiment, comprise the internal memory of a general purpose central processing unit (CPU) 24 modified so as to be directly accessable by any one of a plurality of modules connected to the memory bus 22. In addition to the film scanner 20 and CPU 24, a binary image processor (BIP) 26 and input/output devices 28 are connected to the memory bus 22. An I/O bus 30 is also provided for establishing a direct communication path between the modules 20,24, 26,28. The CPU 24 can comprise any one of a plurality of readily available general purpose stored program computers such as the PDP-10 sold by the Digital Equipment Corporation of Maynard, Massachusetts.

Figure 4:
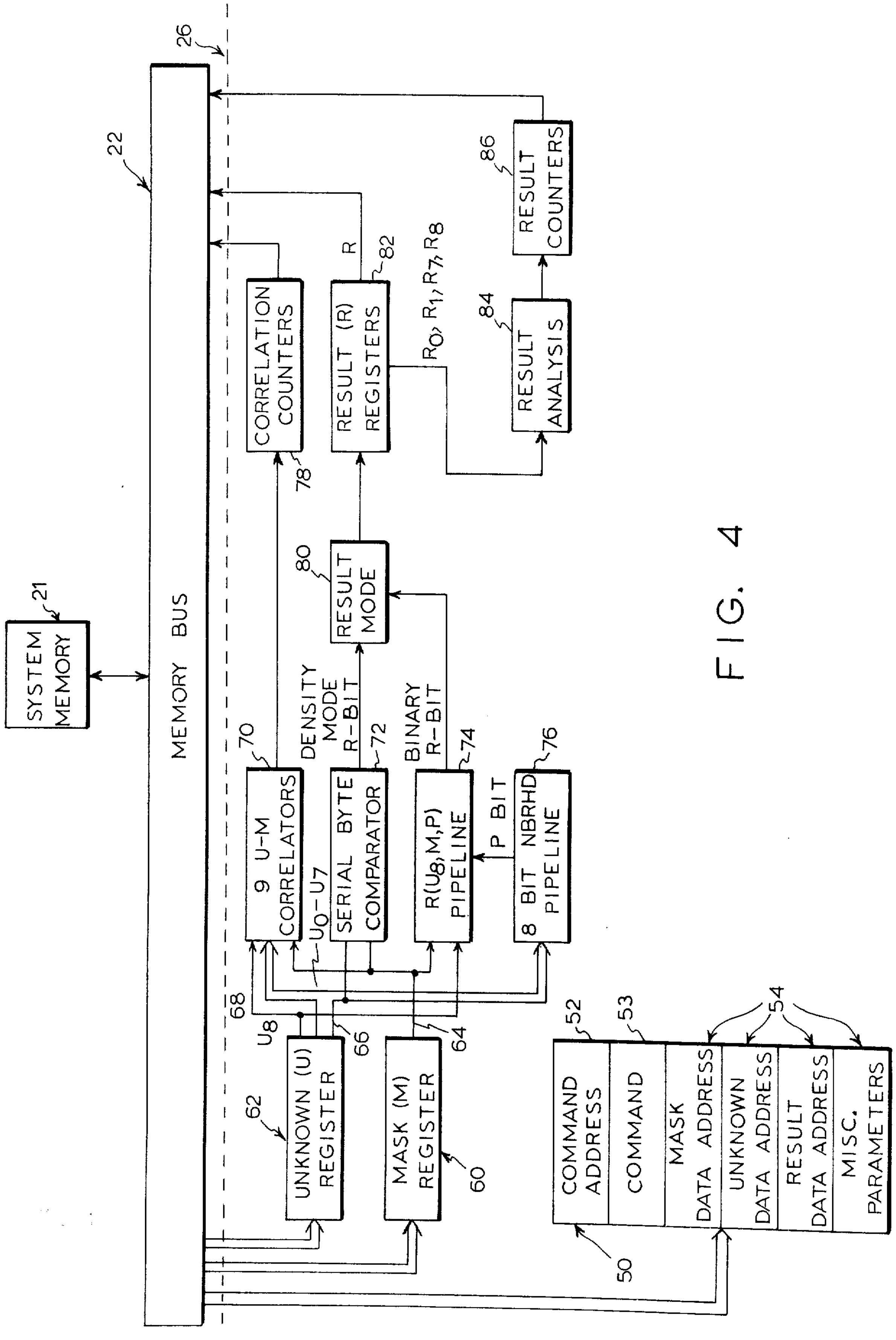
FIG. 4 is a block diagram of a binary image processor in accordance with the present invention.

In the operation of the system of FIG. 1, the CPU 24 causes array data and process commands to be supplied to the BIP 26 and the BIP in turn produces various numeric descriptors, generally describing characteristics of, and relationships between, data arrays supplied thereto. More particularly, the CPU 24 initially sends a starting address to the BIP which defines a block of words in memory 21, each word constituting a BIP command. Thus, the block of words constitutes the BIP program. The BIP then fetches the commands in sequence and each command can cause the execution of a complete image process. In particular, a single command can cause the BIP to load six words of control parameters (to be discussed in connection with FIG. 5) from memory to six parameter registers (FIG. 4). Thereafter, an image process is executed as defined by the control parameters. Following completion of the image process, another command can be fetched, which can, for example, perform another parameter register loading and image process or halt the BIP and notify the CPU. Other commands are available, for example, to transfer numerical results from the BIP to memory 21.

Figure 2:
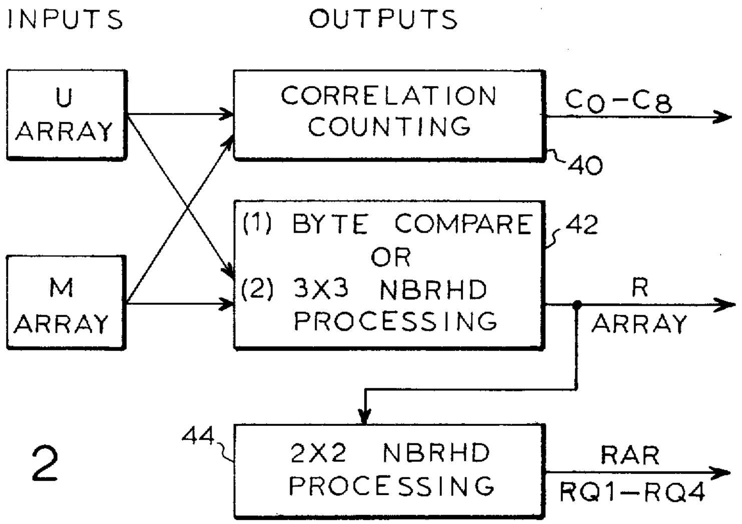
FIG. 2 is a mapping diagram generally depicting the data processing operations performed by the binary image processor of FIG. 1.

During the image processing executed by the BIP 26, one or two arrays of data, denoted the unknown, (U) and the known or mask (M) are accessed from sequential locations in the system memory 21 and supplied to the BIP 26 as inputs as depicted in the mapping diagram shown in FIG. 2. The BIP then executes various operations with respect to the U and M arrays, as represented by the output blocks in FIG. 2. For example, as represented by output block 40, the BIP can execute a correlation counting operation to produce nine output correlation counts $C_0$–$C_8$ representing the comparison of U with respect to M for each of nine relative offsets corresponding to a 3 × 3 neighborhood. For clarity, reference is made to FIG. 3 which depicts the U array and M array with a 3 × 3 neighborhood being shown within the U array and a corresponding bit being shown from the M array. The 3 × 3 neighborhood shown in the U array also illustrates the nomenclature which shall be used herein to identify each of the nine bits within the 3 × 3 neighborhood. Thus, the correlation counts $C_0$–$C_8$ provided at the output of the correlation counting operation block 40 in FIG. 2 represents a correlation between the M bit shown within the M array in FIG. 3*a* and each of the bits within the corresponding 3 × 3 neighborhood in the U array.

Figure 3:
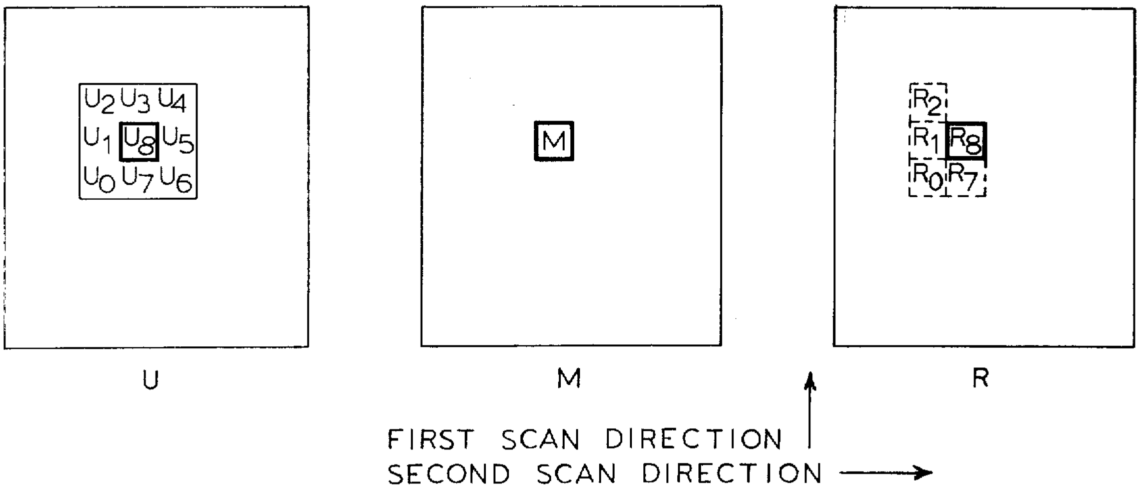
FIG. 3 is a format diagram illustrating the U, M, and R arrays and nomenclature of specific bits.

In addition to correlation counting represented by operation block 40 in FIG. 2, the BIP is able to produce a result (R) array as a function of the U and the M arrays, in two different ways, as represented by the operation block 42 in FIG. 2. The R array, represented by the outer rectangle in FIG. 3, is produced by sequentially producing individual R bits. When operating in a density mode, a byte compare operation is executed by the operation block 42 which involves arithmetically comparing bytes of the U array with bytes of the M array. If, for example, the byte in the U array is arithmetically equal to or smaller than the corresponding byte in the M array, then an R = 1 bit is produced. If on the other hand the byte from the U array is arithmetically larger than the corresponding byte from the M array, then an R = 0 bit is generated.

When operating in the binary mode, as contrasted with the previously mentioned density mode, the operation block 42 of FIG. 2 sequentially produces R bits to form an R array as a boolean function of the U and M arrays. As will be seen, each R bit can be a function of the corresponding M bit and all of the U bits in the corresponding 3 × 3 neighborhood.

In both density mode and binary mode, the R array produced by the operation block 42 is stored back into the system memory 21 and in addition can be subjected to an analysis operation involving a 2 × 2 bit neighborhood consisting of $R_0$, $R_1$, $R_7$, and $R_8$. Additional neighbor $R_2$ is used for a different purpose to be discussed later. Operation block 44 in FIG. 2 produces certain counts designated RAR and $RQ_1$–$RQ_4$ as a function of $R_0$, $R_1$, $R_7$, and $R_8$, the significance of which will be discussed hereinafter. Suffice it to say at this point that these counts constitute numerical descriptors of the R array.

Attention is now called to the FIG. 4 which comprises a block diagram of the binary image processor (BIP) 26 in accordance with the present invention.

Preferably, the BIP 26 is provided with its own supervisory or sequencing circuitry, as indicated at 50 so that the BIP can perform at least a limited sequence of operations independently of the CPU 24. For this purpose, the BIP is coupled directly to the memory bus 22 via appropriate interface circuitry so that data and/or instructions can be exchanged directly with the memory 21. For convenience in describing the operation of the system, those "instructions" which are obtained by the BIP 26 itself directly from memory are referred to as "commands", leaving the term "instruction" to indicate an instruction in the program of the CPU 24.

The control circuitry 50 for the binary image processor 26 preferably includes at least the following: (1) a command address register 52 which is used to sequentially define addresses in the memory 21 from which the BIP 26 obtains sequential command, (2) a command register 53 stores the command data obtained from memory 21 at the last address designated by register 52. The parameter registers 54 functionally include a mask data address storage means which serves to designate addresses in the memory 21 from which the processor obtains data representing certain known or mask images as described hereinafter; an unknown data address storage means which is employed to designate an address in the core memory 21 from which the binary image processor 26 obtains data representing unknown images which are to be analyzed or identified; a result data address storage means which designates core memory addresses in which the binary information processor may store data representing result images which are generated as a part of the operation of the processor 26; and a parameter storage means which functions to store other parameter data to be discussed in detail hereinafter in conjunction with FIG. 5.

While the present invention is primarily concerned with the binary image processor 26, a further explanation of the overall mode of operation of the peripheral apparatus in cooperation with the CPU 24 and memory 21 will aid in understanding the purpose and functioning of the processor itself. Assuming that the core memory 21 has been appropriately loaded with sequences of commands for the BIP 26, tables of appropriate operating parameters and arrays of image data with which the processor is to work, the CPU 24 can then initiate operation of the processor 26 by setting the command address register 52 to the memory address of the first command to be executed. The control circuitry 50 associated with the processor 26 then loads the command from the memory into the command register 53. Typically, the first command will cause the control apparatus itself to load the various parameter registers 54. Following loading of these registers, the image process itself is begun, during which words are accessed from memory which constitute the mask and unknown image arrays, and during which words may be stored into memory, constituting the result image array. As the mask and unknown words are accessed from memory, they are loaded into a mask data (M) register 60 and unknown data (U) register 62, respectively, within the processor. The mask and unknown data are then utilized in the execution of the image process and upon completion, the command address register 52 is incremented to fetch a subsequent command in a sequential series from memory 21 for loading into command register 53. The subsequent command may then store the numeric results in the BIP counter back into memory or alternatively may perform another image process on the same or other arrays. As is conventional, the last command in a sequence of commands may cause the control circuitry 50 to flag or interrupt the CPU 24, so that further operation of the processor may be reinitiated under CPU program control.

The binary image processor 26 of this invention operates with images which are in the form of arrays of binary data stored in the core memory 21. A portion of this data will represent unknown images which are to be analyzed or identified. Such images may, for example, be obtained from a document or microfilm reader or scanner operating in real time and also being controlled by the CPU 24 on a time-shared basis. Alternately, the unknown image data may be introduced into the memory 21 through the intermediary of magnetic tape or disk or other temporary data storage medium. In general, the following description assumes that image points or elements are represented by a binary "one" while each point of the background is represented by a "zero". It will, however, be recognized that a complementary organization is equivalent and the claims herein should be accordingly construed. Either the binary "one" or the binary "zero" can be considered to be a predetermined binary state.

Another portion of the stored data represents known images. Some of these known images may be considered to be masks against which the unknown images are to be compared and correlated, while other of the known images may be special purpose designs or mosaics useful in the analysis of unknown images under the control of an optical character reading or image analysis program being performed by the CPU 24. As noted previously, a portion of the core memory 21 will also be used for storing sequential commands or operation control codes which are to be executed by the binary image processor 26 and various parameters which are used by the processor.

It has been mentioned that the mask and unknown data accessed from the memory 21 are respectively loaded into the mask data register 60 and unknown data register 62. In operation, the mask register 60 serially provides mask data bits, one at a time, on output terminal 64. The unknown data register 62 provides nine output bits in parallel corresponding to $U_0$–$U_8$ shown in FIG. 3*a*. Bits $U_0$–$U_7$ are provided on eight output lines which together are represented by the numeral 66 in FIG. 4. Output bit $U_8$ is provided on output terminal 68.

The output terminals 64, 66, and 68 are each connected to the inputs of logic networks 70, 72, 74 and 76 which will be described in greater detail hereinafter. The logic network 70 participates in the correlation counting operation previously referred to in FIG. 2 (block 40). Logic network 70 is responsive to the data provided on register output terminals 64, 66, and 68, functioning to compare each mask bit with nine unknown bits $U_0$–$U_8$ (Refer to FIG. 3*a*). The logic network 70 determines whether the mask bit matches or mismatches each bit of the corresponding 3 × 3 bit unknown neighborhood and transfers this information to nine correlation counters 78 which accumulate counts through a sequence of mask bits constituting a mask data array. The information accumulated by the correlation counters 78 is a measure of the shape similarity and relative positional offset between the mask and unknown data arrays. Under program control, the counts accumulated by the correlation counters 78 are stored back into the system memory 21 via the memory bus 22. This correlation operation will be discussed in greater detail in conjunction with FIG. 10.

The logic network 72 performs a comparison between multi-bit bytes derived from the M and U registers 60 and 62. That is, the logic network 72 can compare the arithmetic magnitude represented by a series of bits provided from the mask register 60 against a corresponding series of bits provided from the unknown register 62 to generate a result (R) bit. If, for example, the byte in a U array is arithmetically smaller than or equal to the corresponding byte in the M array, then an R equals "1" bit is produced. If on the other hand the byte from the U array is arithmetically larger than the corresponding byte from the M array, then an R equals "0" bit is generated. The R bit information developed by the logic network 72 is passed through a result mode gating structure 80 which loads the output of either the network 72 or the network 74 into result (R) registers 82.

When operating in the binary mode, the result mode gating 80 couples the output of logic network 74 to the result registers 82. The logic network 74 develops the R bit as a function of the mask bit derived from terminal 64, bit $U_8$ derived from terminal 68 and a P bit provided by network 76. Network 76 is responsive to bits $U_0$–$U_7$ available at output terminal 66 of U register 62. As will be discussed hereinafter in conjunction with FIGS. 5 and 10, the P bit is formed as a particular function of bits $U_0$–$U_7$, the particular function being defined by the configuration of the parameter registers 54. Similarly, R is formed in the network 74 as a particular function of $U_8$, M, and P, the particular function being defined by the contents of the parameter registers 54.

The R bits gated out of the result mode gating structure 80, in addition to being stored in registers 82, are applied to a result analysis network 84 which, together with result counters 86, correspond to the operation block 44 represented in FIG. 2. The result analysis network 84, to be discussed in greater detail hereinafter, counts various sets of patterns within overlapping 2 × 2 neighborhoods.

Figure 5:
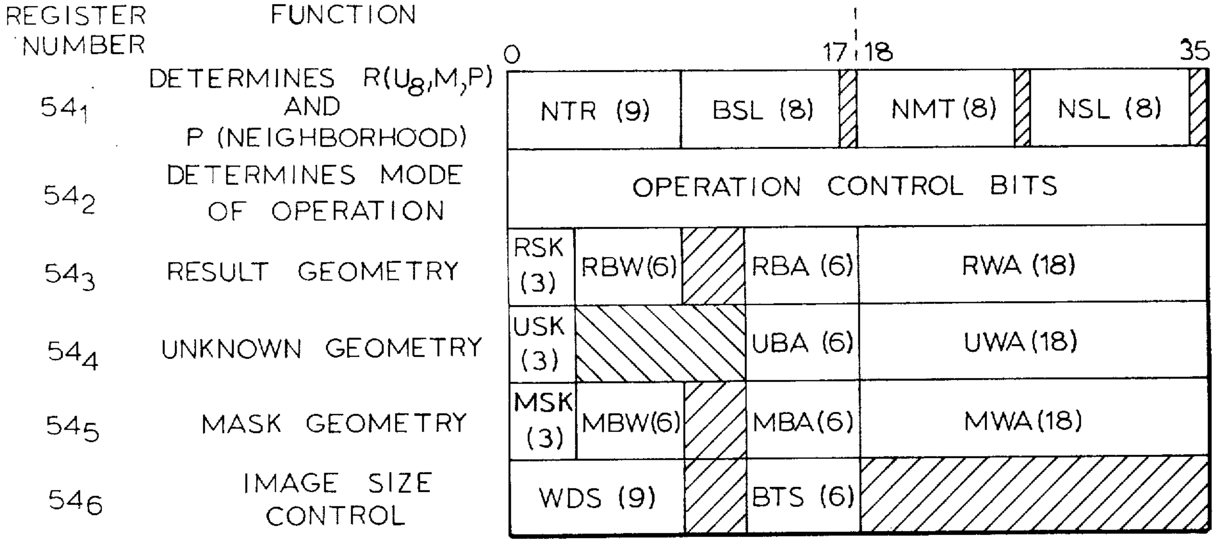
FIG. 5 is a parameter register format diagram.

In accordance with the preferred embodiment of the invention, the parameter registers 54 of FIG. 4 are preferably comprised of six 36 bit parameter registers $54_1$–$54_6$ as illustrated in FIG. 5. In order to specify completely the exact image processing action in the BIP, these six registers $54_1$–$54_6$ must be loaded with parameter information from memory 21. The fields of interest within these registers in FIG. 5 are as follows.

SYMBOL DEFINITIONS

| | |
|---|---|
| NTR: | Neighborhood threshold - determines which neighborhood populations will cause the P bit to equal 1. |
| BSL: | Boolean Selection - determines the function $R(U_8,M,P)$. |
| NSL: | Neighborhood Selection - is ANDed with the W neighborhood. (see FIG. 10B.) |
| NMT: | Neighborhood Match - is exclusive - ORed with (NSL·W) |
| RWA: | Result Word Address - starting location in memory of R image array. |
| RBA: | Result Bit Address - starting bit address of R words. |
| RBW: | Result Bytes (Bits) Per Word - form factor for R image array. |
| RSK: | Result Skip - enables R array to occupy non-consecutive addresses. |
| UWA: | |
| UBA: | See RWA, RBA, RSK |
| USK: | |
| MWA: | |
| MBA: | See RWA, RBA, RSK |
| MSK: | |
| MBW: | Mask Bits (Bytes) Per Word - form factor for M image array. |
| WDS: | Word Size - determines the number of words of image array the BIP is to process. |
| BTS: | Bit Size - determines how many bits in each image word to process. |

OPERATION CONTROL BITS

| | |
|---|---|
| DNS: | Density Mode - causes the BIP to generate R bits from a cell-by-cell comparison of bytes in the U and M images. |
| SMW: | Single Mask Word - causes one memory word to be used repeatedly for the entire M array. |
| PUB: | Polarity, Unknown, Bit axis - reverses each word of U before it reaches the serial processor. |
| PUW: | Polarity, Unknown, Word axis - causes U to be picked from successively lower address in memory. |
| PMB: | |
| PMW: | See PUB, PUW |
| PRB: | |
| PRW: | Analagous to PUB, PUW |
| CWN: | Cumulative word neighbors - causes neighborhood bits $U_0$, $U_1$, $U_2$ to be replaced by corresponding bits in the previously generated R word. |
| CON: | Causes the W-neighborhood population (number of 1's) to be related to the "Euler differential" of the neighborhood. |
| CUM: | Correlate on U·M - enabling condition for the nine correlation counters. |
| CNM: | Correlate on $\overline{U}\cdot M$. |
| CUN: | Correlate on $U\cdot\overline{M}$. |
| ROT: | Result Outside Value - state of R array outside its bounds, needed for certain 2 × 2 neighborhoods. |

Starting locations in memory of the input arrays U and M, and of the output array R, are specified by the 18-bit word address fields RWA, UWA, and MWA in registers $54_3$, $54_4$ and $54_5$ as shown in FIG. 5. The six-bit quantities UBA and MBA define initial vertical or bit-axis coordinates: the bit in position UBA, $0 \leq UBA \leq 35$, is the first one fetched by the U logic in each word of the U image; similarly for M. RBA is the bit axis coordinate at which the first bit of R is stored, in each word of R. When a binary (non-density mode) image process is started, the bits located at (UWA, UBA) and (MWA, MBA) are fetched, along with the eight neighbors of the U bit. As a function of these 10 bits, the first R bit is generated, which is later stored in memory at (RWA, RBA). The processor then continues processing successive bits in the words at UWA and MWA, generating more R bits to be stored into address RWA. This continues until BTS bits have been processed. The BIP 26 then accesses the bits at (UWA+1, UBA) and (MWA+1, MBA). Successive words are processed in this manner until a total of WDS words have been handled.

Figure 6:
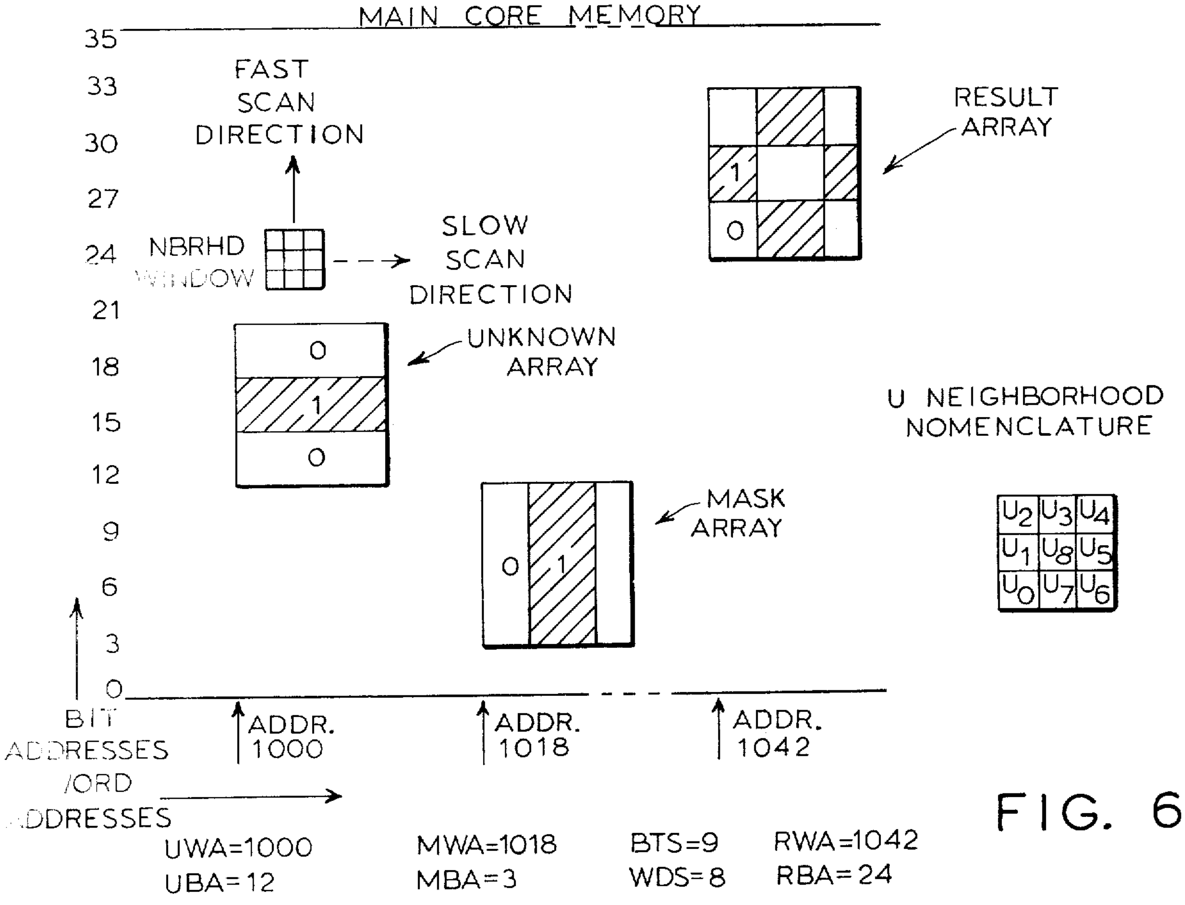
FIG. 6 is an illustrative diagram depicting an exemplary binary mode processing operation performed with respect to data array information stored in memory.

FIG. 6 represents an exemplary binary image transformation in which a Result array is generated by the bit-by-bit "exclusive-or" of the Unknown and Mask arrays. Also represented is a 3 × 3 neighborhood "window" showing its normal direction of scanning through an image. Note that the quantities (UWA, UBA) and (MWA, MBA) specify the portions of the unknown and mask arrays to be compared and that (RWA, RBA) specifies the memory locations into which the result array is stored.

Additional geometric flexibility in handling arrays is obtained with the skip factors RSK, USK, and MSK, and the packing (bytes or image columns per word) factors RBW and MBW. Setting USK>0 causes U to be fetched not from consecutive memory locations, but from UWA, UWA + (USK+1), UWA + 2 (USK + 1), etc., and similarly for MSK and RSK. Setting MBW>1 enables more than one geometric array column to be stored in each memory word of M; similarly for RBW.

Parameter register $54_1$ determines how the P and R bits are normally generated, as described below. Register $54_2$ contains operation or mode control bits which were previously defined, each of which specifies some special operation or mode.

Figure 7:
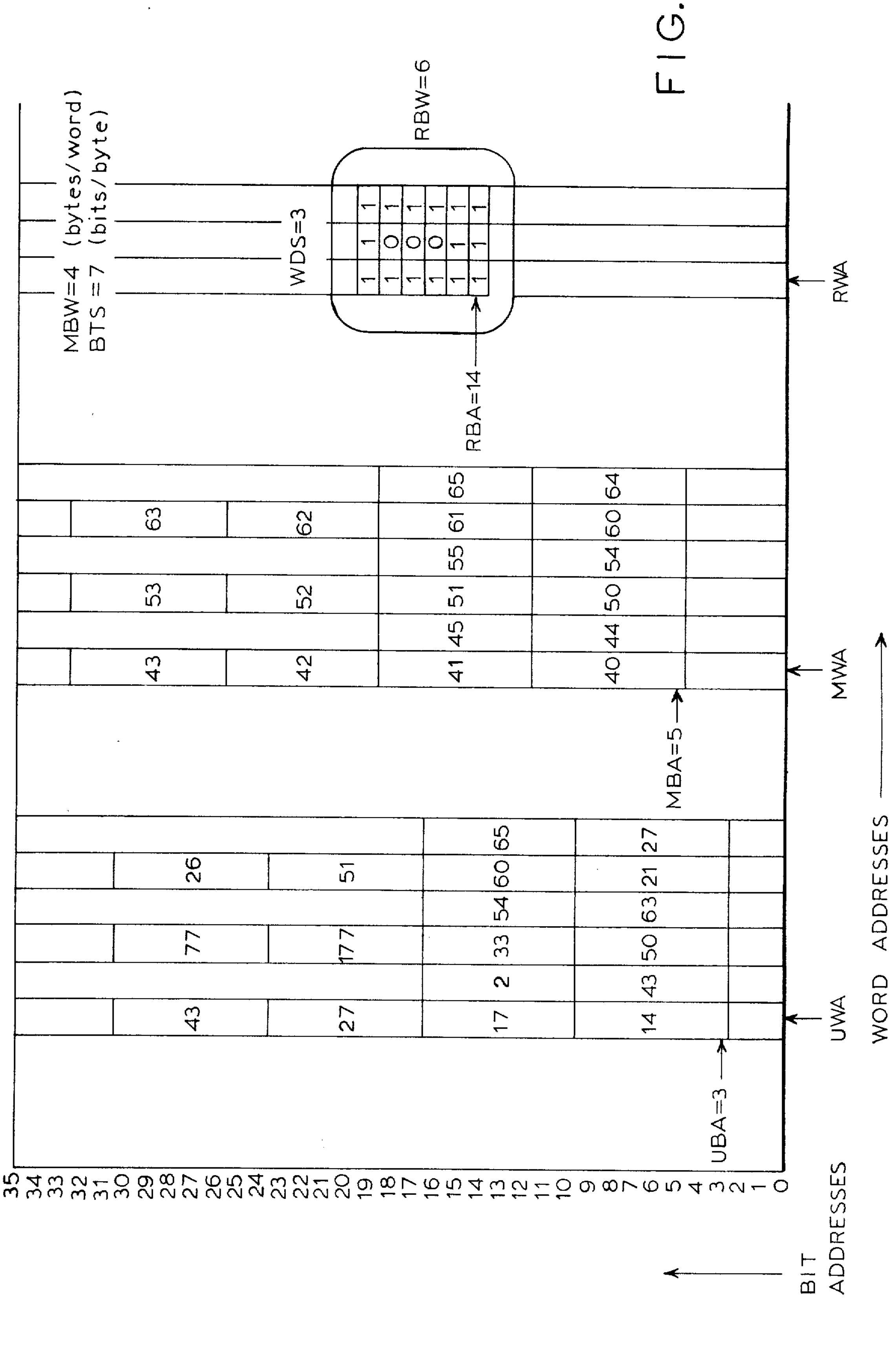
FIG. 7 is an illustrative diagram depicting exemplary density mode processing operation.

Control bit DNS is particularly important because if DNS is on ("1"), the BIP's image process does not in effect examine bits from the M array and neighborhoods from the U array, but instead considers U and M each to consist of strings of numerical bytes, each byte being comprised of multiple bits as defined by BTS. A byte from U is compared arithmetically with a corresponding byte from M, and if $U_{byte} \leq M_{byte}$, a "1" bit is generated and inserted into the R array. If $U_{byte} > M_{byte}$, a "0" bit is generated for the R array. Exemplary image formats for DNS mode are shown in FIG. 7. Byte length for M and U is determined by parameter BTS (= 7 in FIG. 7); number of bytes per M and U word is set by parameter MBW(=4); number of rows in the R image is given by RBW(=6); number of columns in R is set by WDS(=3).

In both binary and density mode, the R image is being neighborhood-analyzed as it is generated, in a manner which will be explained later.

Figure 8A:
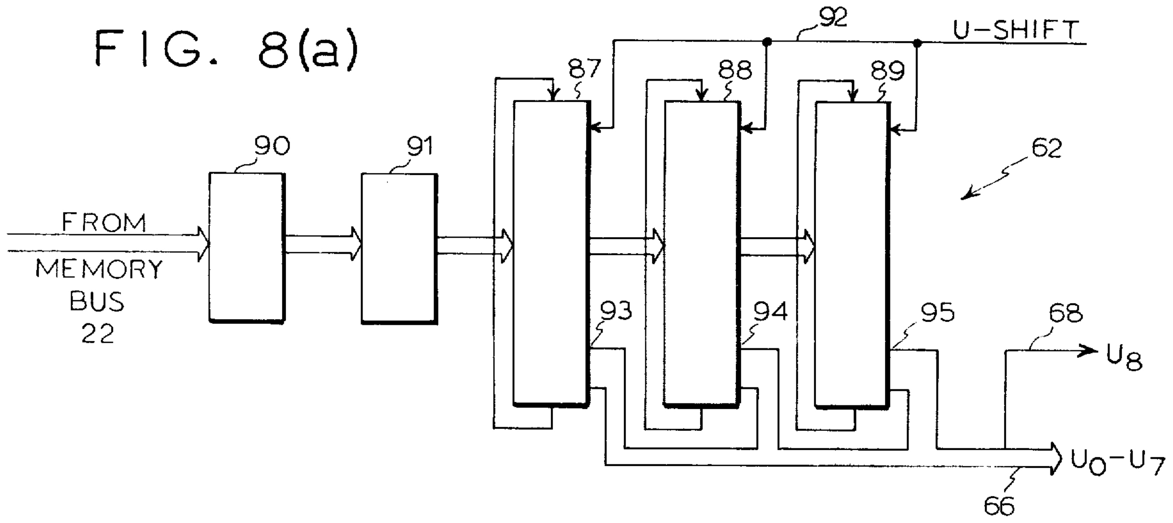
FIGS. 8*a*, *b*, and *c* are block diagrams respectively illustrating in greater detail than in FIG. 4, first embodiments of U, M, and R registers in accordance with the present invention.

Attention is now called to FIGS. 8*a*, *b*, and *c* which respectively illustrate first embodiments of the U, M and R registers 62, 60 and 82 referred to in FIG. 4. The embodiments of FIG. 8 employ multiple shift registers to develop the previously mentioned 3 × 3 window with respect to the U array and 2 × 2 window with respect to the R array.

Figure 8B:
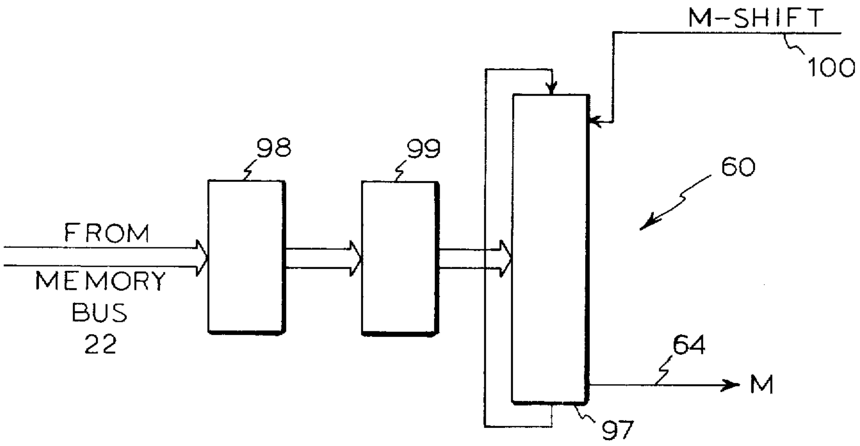
Figure 8C:
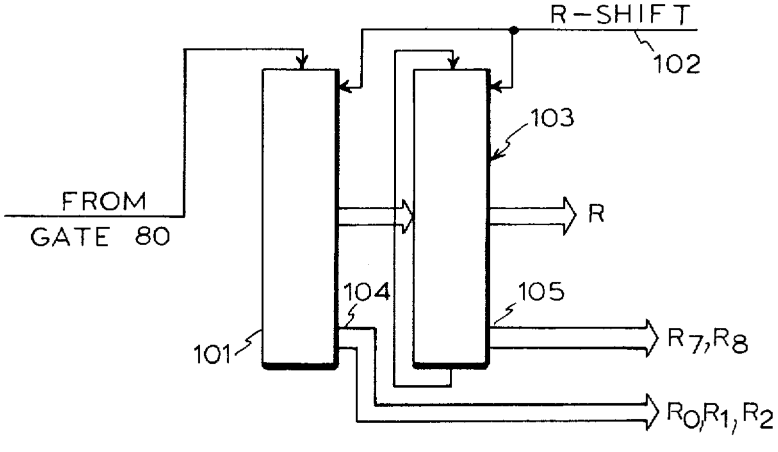

More particularly, the U register 62 of FIG. 8(*a*) is comprised of three one word shift registers 87, 88 and 89, each of which will be assumed to contain thirty six bits, for holding and manipulating portions of the unknown image data. The first shift register 87 is adapted to be loaded from the core memory 21 through a buffer 90 and gating circuitry 91. Each of the other registers 88 and 89 is adapted to be loaded in parallel with data from the previous register in the series, synchronously with the transfer of data to the first register 87 from the buffer 90. For reasons which will be more apparent hereinafter, the unknown image data held by the register 88 is designated the present unknown image word, while the registers 87 and 89 hold the next and the previous unknown image words, respectively.

The lines or words of binary data held in the registers 87, 88, 89 may be shifted, within the respective register, in conventional synchronous manner under the control of a U-bit shift signal applied through a lead 92. Each of the registers 87, 88, 89 is connected, as indicated, so that the spillover of data from the downstream end of the register is reintroduced into the same register at its upstream end. Thus, the binary data or word in each register is, in effect, circulated by repetitive shifting so that, after a number of shifts equal to the length of the register, the stored word is back where it started. The registers 87, 88, 89 also include means for reading out the last three bits in each register, as indicated at 93, 94, 95 so that a 3-bit by 3-bit block of data is available for sampling. In FIG. 8 and elsewhere, the flow of data which comprises a plurality of parallel or simultaneous binary signals is represented by a broad arrow, while single bit signals or conductors are indicated by a single line. As an alternative to the parallel shifting of data between registers described above, the spillover from each of the first two could be introduced into the upstream end of the next register.

As the binary words held in the three registers 87, 88, and 89 are circulated, the stored data is, in effect, scanned in a succession of blocks along one of the axes described previously. For convenience in description of the operation of this apparatus, this axis is herein referred to as the vertical or bit axis. The other of the two axes is referred to as the horizontal or word axis. As will be understood by those skilled in the art, the image may be scanned along the word axis, following the complete scanning of each word along the bit axis, by shifting binary words from each register in the series to a subsequent register, the binary data in the last register 89 being lost with the first register 87 being filled from the memory through buffer 90. It should be appreciated that the three bits derived from each of the registers 87, 88, 89 correspond to the nine bits $U_0$–$U_8$ depicted in FIG. 3(*a*) and that the register output terminals 66 and 68 referred to in FIG. 4 are derived from the last three bit positions indicated at 93, 94, 95 of these registers.

FIG. 8(*b*) illustrates the previously mentioned M register 60 which preferably includes a single one word shift register 97 for holding one line or word of data representing a known or mask image. Register 97 can be selectively loaded from the core memory 21 through a buffer 98 and gating circuitry 99. The data in register 97 can be shifted bit by bit by means of an M shift signal applied through a lead as indicated at 100 and the register is connected to that spillover from the downstream end of the register is fed back into the upstream end of the register. This arrangement provides for circulation of the held mask image data in the same manner as the unknown image data held in registers 87, 88, 89. However, since this data is not typically used more than once, an alternative is to just dump the spillover data. It should be appreciated that the output of the last stage of register 97 corresponds to terminal 64 of FIG. 4 and provides the M bit represented in FIG. 3.

Assuming that the known image data in register 97 is circulated synchronously with the circulation of the unknown image data in the registers 87, 88, and 89, each bit read out of the known image register 97 will generally correspond in location within the respective image to the location of the respective 3 × 3 block of sampled data within the unknown image.

As will be understood by those skilled in the art, it may be necessary, depending upon the respective image formats, to provide predetermined amounts of preshifting and postshifting of the arrays of image data on each of the two axes in order to provide the desired predetermined registration between the unknown and mask images. However, as such requirements will depend upon the particular construction and logic systems used and are not central to the explanation of the present invention, these variations are not explained in detail. In general, since the unknown image is examined or scanned in blocks which encompass three binary words or lines of the image data, while the mask image is scanned bit by bit within each word, it will be desired to preshift the unknown image data on the word axis so that the current unknown image word held in register 88 corresponds in location within the desired image format to the location of the single mask word in register 97. Likewise, it is typically desirable to preshift the unknown data long the bit axis so that the central bit $U_8$ of the 3 × 3 block of unknown data corresponds in location within the total image to the location of the particular sampled bit M of the known image data. Preferably, this preshifting is controlled within the peripheral apparatus itself without interrupting the CPU 24, the desired preshift quantities being among the parameters held in the parameter registers 54, for example the difference between the bit-axis coordinates UBA and MBA. Similarly, since the unknown image is sampled in a 3 × 3 block while only a single bit is taken from the known or mask image, there is, in effect, a "border" of unknown image sample positions, around the overall image, for which there is no corresponding known image sample position. Typically, it is desired that these border bits in the U-neighborhood be arbitrarily set to a predetermined value, typically "zero", the "background" value.

As the data arrays representing the known and unknown images are scanned, the result signal provided by the gating structure 80 (FIG. 4) is applied bit by bit to a one word shift register 101 (FIG. 8(*c*)). In normal operation, the data held in register 101 is shifted in synchronism with the shifting of the lines of unknown and known data held in registers 87, 88, 89 and register 97, respectively in response to an R-bit shift signal applied through a line 102. Thus, as each word or line of known and unknown data is scanned, a corresponding line of result image data is generated and stored in the register 101.

The data in register 101 can be transferred in parallel to a second result data register 103 as indicated, the data in this second result data register being shifted in synchronism with that in the register 101. Thus, after a first result binary word has been generated and has been transferred from register 101 to register 103, a pair of result image data words will be available.

The binary word held in register 103 is provided to the memory bus 22 as indicated in FIG. 4. Thus, as each line of result data corresponding to a given line of unknown data is completed, a previous word of result image data is stored in memory 21 at a location determined by the contents of the result word address in parameter registers 54. Thus, as an entire unknown image is scanned, a result image, related to the unknown image according to a pre-selected logical function, is built up and stored in memory. Means are provided at 104 and 105 for accessing the last two bits from each of the registers 101 and 103 to yield the 2 × 2 bit window comprised of bits $R_0$, $R_1$, $R_7$, $R_8$ as mentioned in conjunction with FIG. 3; also, bit $R_2$ is made available, which, together with $R_0$ and $R_1$, is used in CWN mode as explained hereinafter.

Although the shift register embodiments of registers 62, 60, and 82 (FIGS. 4 and 8) are attractive due to their simplicity and low cost, it should be understood that the registers 62, 60, and 82 can be implemented in different manners to achieve particular advantages. For example, it will be appreciated that in the shift register embodiments of FIG. 8, the contents of each register (assumed to be 36 bits) must be completely rolled around before a subsequent word can be brought into the register. That is, considering register 62 for purposes of illustration, 36 bit times of U-shift pulses are required to roll around the word in register 87 before that word can be transferred to register 88 and be replaced by a new word. Thus processing speed is limited by the length of the shift registers. Since some processing tasks may involve only a portion of the 36 bit word, overall processing speed can be increased by utilizing an implementation as shown in FIG. 9 which can randomly access the sample bits of interest.

Figure 9:
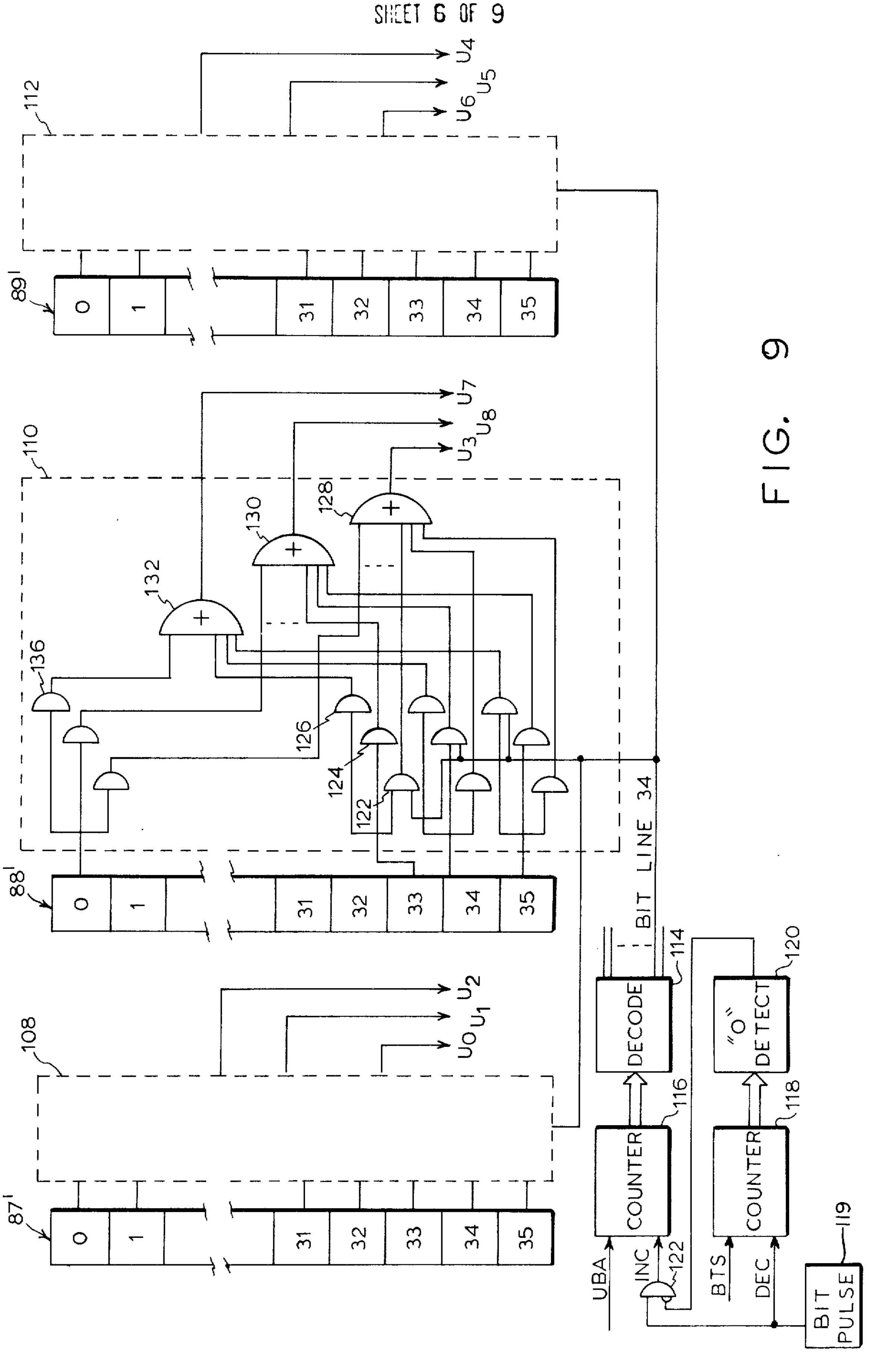
FIG. 9 is a block diagram of an alternate embodiment of the U register in accordance with the present invention.
Figure 10B:
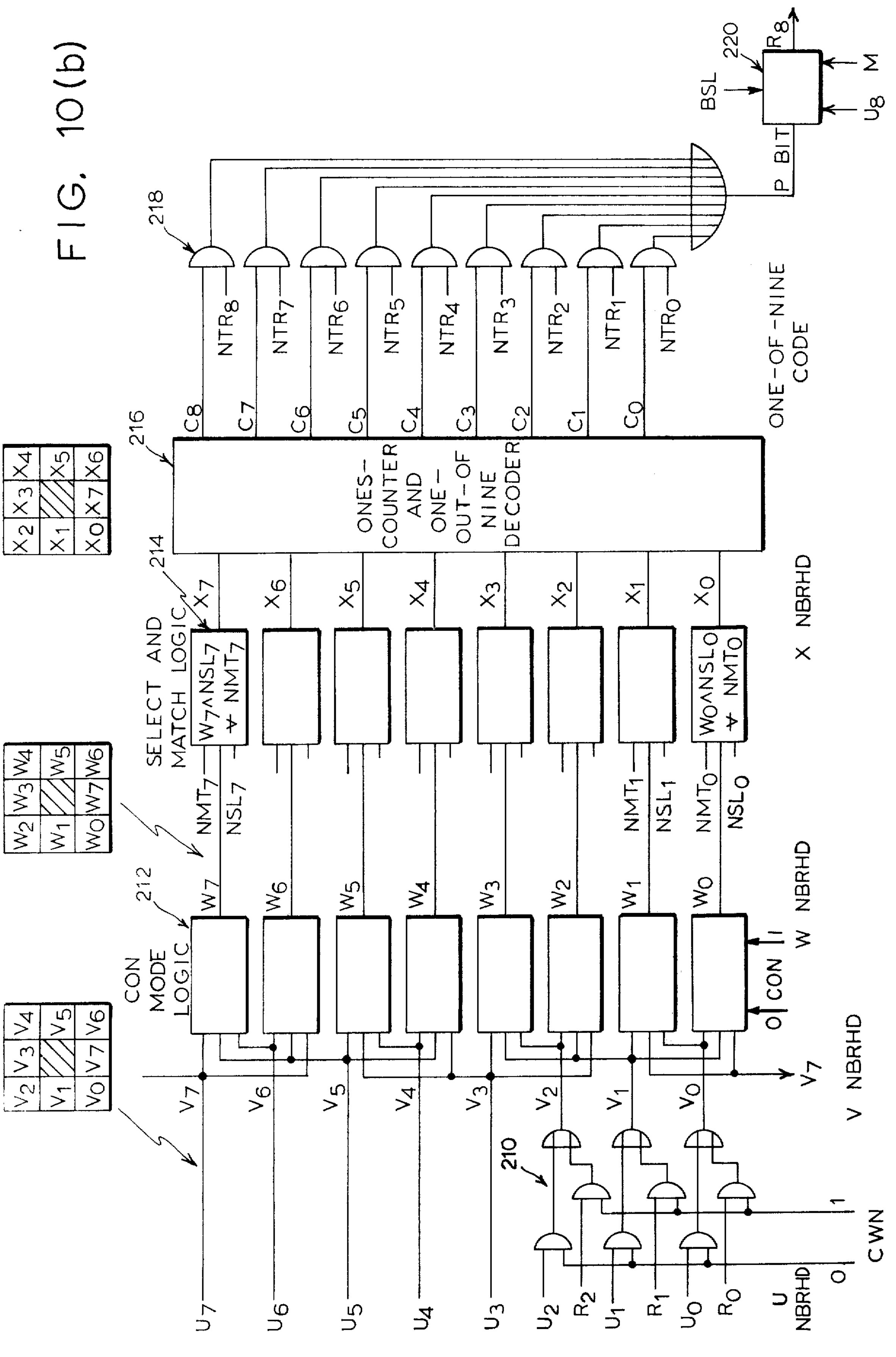
FIG. 10(*a*), (*b*), (*c*), and (*d*) are block diagrams illustrating in greater detail than in FIG. 4, particular logic networks and data flow paths therein.
Figure 10A:
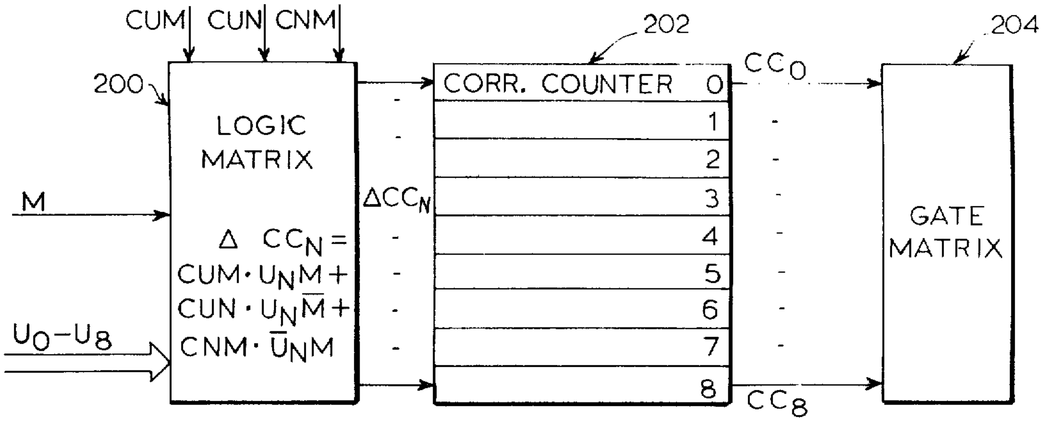

More particularly, FIG. 9 illustrates three single word (36 bits) parallel output registers 87′, 88′ and 89′ which respectively correspond in function to the three previously referred to shift registers 87, 88, and 89 in FIG. 8(*a*). Each of the registers 87′, 88′, and 89′ can be loaded with 36 bits in parallel and can be accessed in parallel. As in FIG. 8(*a*), register 87′ of FIG. 9 is loaded from the memory bus 22. Register 88′ is loaded in parallel from register 87′ (means not shown) and similarly register 89′ is loaded in parallel from register 88′ (means not shown).

In contrast to the embodiment of FIG. 8(*a*) which requires complete roll around of the word within each register prior to a new word being transferred to that register, the embodiment of FIG. 9 enables portions of words to be randomly accessed. As a consequence, overall processing time will be roughly proportional to the image size being processed rather than completely independent of the image size as in the case of FIG. 8(*a*).

It will be recalled from the description of FIGS. 4 and 5, that the parameter registers 54 are loaded with two six bit quantities designated UBA and BTS. The quantity UBA identifies a starting bit position in the memory 21 from which an unknown data bit is accessed. The quantity BTS identifies the number of bits to be processed. As an example, assume that it is desired to process a small image fully contained between bit positions 12 and 20 of the unknown data word. In such a situation, as depicted in FIG. 6, the quantity UBA will be given a value of twelve meaning that bit twelve will be the first bit to be processed. The quanity BTS will be given a value of nine meaning that a total of nine bits, i.e. bits 12–20, are to be processed. By defining the particular portions of the unknown data words to be processed, the overall processing time will be roughly proportional to the image size, rather than independent of image size as is the case where shift registers are employed as in FIG. 8.

In order to access the particular portion of the unknown data word from the registers 87', 88' and 89' of FIG. 9, identical multiplexer structures, respectively identified as 108, 110, and 112 are connected to the parallel outputs of the registers 87', 88' and 89'. As will be explained in greater detail hereinafter, the multiplexer structures are responsive to the output of a "1 in 36" decoding network 114 for accessing a particular three bits form each of the registers.

Counters 116 and 118 are respectively provided for initially storing the quantities UBA and BTS. In the previously mentioned example, the quantity UBA = 12 would be transferred from the indicated portion of parameter register $54_4$ (FIG. 5) to the counter 116. Similarly the quantity BTS=9 would be transferred from the appropriate field of parameter register $54_6$ into the counter 118. A source of bit pulses 119 is provided to respectively increment the counter 116 and decrement the counter 118. This incrementing and decrementing continues until the counter 118 reaches a count of zero at which time the counter 116 will have sequenced through all the bit counts of interest. A zero detect circuit 120 is provided to detect a zero count in counter 118. When the zero count is detected, further incrementing of the counter 116 is inhibited via gate 122. The output of counter 116 is applied to the decoder network 114 which enables one of thirty six output lines for each of 36 different counts defined by the counter 116. Each of the 36 output lines of the decoder network 114 initiates retrieval of a different three bit set from the registers 87', 88' and 89'.

As previously mentioned, multiplexers 108, 110, and 112 are identical. For the sake of brevity and clarity FIG. 9 only illustrates multiplexer 110 in detail. The interconnection of the bit output line 34 of decoder 114 to the internal gates of multiplexer 110 is also illustrated. It will be understood that this illustrated interconnection is typical of all of the other interconnections between the decoder bit output lines and the multiplexers.

From what has been said in connection with Figure FIG. 8($a$), it will be recalled that it is desired to access three adjacent bits at a time from each of the registers 87', 88' and 89'. For example, when bit output line 34 of the decoder 114 is enabled, it is desired to access bits 33, 34 and 35 from the registers 87', 88' and 89'. In order to accomplish this, the ouput of each stage of the registers is connected to three separate AND gates 122, 124, and 126. The outputs of all of the AND gates 122 are connected to the inputs of an OR gate 128. Similarly, the outputs of all of the gates 124 are connected to the inputs of OR gate 130 and the outputs of all of the gates 126 are connected to the inputs of OR gate 132. The outputs of OR gates 128, 130, and 132 of multiplexer 110 responsive to the register 88', respectively provide the bits $U_3$, $U_8$, and $U_7$ corresponding to the center column of the 3 × 3 bit window shown in FIG. 3.

More particularly, when a bit output line of the decoder 114 is enabled, it in turn enables an AND gate connected to the outputs of three adjacent stages in each of the registers 87', 88', and 89'. Viewing the typical interconnection illustrated in FIG. 9, when the bit output line 34 is enabled, it in turn enables AND gate 126 associated with stage 35, AND gate 124 associated with stage 34, and AND gate 122 associated with stage 33. Thus, the bits of stages 33, 34, 35 will be respectively passed through OR gates 128, 130, and 132 to constitute the bits $U_7$, $U_8$, and $U_3$ of the 3 × 3 bit window referred to in FIG. 3. As each set of three bits is accessed from a register 87', 88', 89', the counter 116 is incremented and the counter 118 is decremented until the counter 118 reaches a count of zero. Once that occurs, then the contents of the registers 87' and 88' are respectively transferred in parallel in registers 88' and 89' and a subsequent word is brought from memory into the register 87'.

From the foregoing explanation of FIG. 9, it will be recognized that processing time required to access the bits of unknown data for processing is proportional to the size of the image and not independent of the image size as in the situation of FIG. 8($a$). Although the mechanization of FIG. 9 has been illustrated for the U register only, it should of course be readily appreciated that the M and R registers 60 and 82 of FIG. 4 must be similarly implemented in order to achieve this economy in processing time.

Attention is now called to FIG. 10 which illustrates the logic networks 70, 74, 84 and 72 of FIG. 4 in greater detail. It will be recalled that the correlation logic network 70 operates to generate a correlation signal for each bit of the 3 × 3 bit sample taken from the unknown data held in register 62.

Each correlation signal is a preselected logical combination or function of the respective unknown image bit ($U_0$–$U_8$) and the single or common known image bit (M), the same combination logic function being used for all nine of the unknown data sample bits to generate the respective correlation signals. The particular logical function which is generated is controlled by a binary correlation code which is one of the control parameters stored in the register $54_2$ (FIG. 5). This correlation code comprises three control bits, designated CUM, CUN and CNM, which are applied to the correlation logic matrix 200 (FIG. 10($a$)). The output signal ($\Delta CC_N$) for each of the nine positions in the 3 × 3 sample array, i.e. for N = $\phi$ through 8, can be expressed in Boolean algebra as follows:

$$\Delta CC_N = CUM \cdot U_N \cdot M + CUN \cdot U_N \cdot \overline{M} + CNM \cdot \overline{U}_N \cdot M$$

It can thus be seen that the matrix 200 is essentially a completely general logic gate matrix so that, under the control of the correlation code, the matrix can form most useful Boolean combinations of each unknown image bit and the common known image bit.

The nine correlations signals provided by the matrix 200 drive respective counters $202_0$–$202_8$, the counts accumulated by these counters being designated $CC_\phi$ –$CC_8$ corresponding to the unknown sample bits $U_\phi$ –$U_8$. Thus, as the respective known and unknown images are scanned, the counters $202_0$–$202_8$ will accumulate counts representing the number of times the particular preselected logical function has generated a logic "one" or "true" signal for each bit position within the sample block. Correlation information is thus obtained which indicates the relationship of the unknown (U) image to the known (M) image, not only at the center position but also for each of eight shifted positions of the image. Furthermore, the basis on which this correlation is obtained may be flexibly varied under the control of the computer programmer by his choice of the correlation code. It will be understood that the most common type of correlation is that provided by the EXCLUSIVE-OR function obtained by setting CUN and CNM, so that $$\Delta CC_N = U_N \oplus M$$
$$= U_N \cdot \overline{M} + \overline{U}_N \cdot M$$

Counters $202_0$–$202_8$ are connected to the memory bus 22 (FIG. 4) so that the counts accumulated can be read back to the memory 21 after an entire image has been scanned, the counters being then reset. The image processor 26 preferably further includes a gate matrix 204 for determining and identifying which of the counters $202_0$–$202_8$ has accumulated the largest count. This designation is also applied to the memory bus 22 for storage in memory 21 and subsequent use in the optical character reading program so that the position providing the best correlation is readily identified.

As noted previously, the nine U bits and the single known data bit (M) are also applied to the result logic circuitry 74, 76. This circuitry generates a single bit output signal R representing a preselectable logical combination of various signals applied thereto, including the 10 unknown and known image data samples, $U_\phi$ –$U_8$ and M.

As is described in greater detail hereinafter, the result image may be a modified or improved version of the original unknown image, depending upon the process used for generating the R-bit signal. While the result image typically will be of the same relative size as the original unknown image, it should be noted that the unknown image can be, in effect, expanded or contracted if the scanning of the unknown and result image data arrays proceeds asynchronously rather than synchronously on one or both axes. If the result image is scanned faster than the original unknown, the image is expanded, a given R-bit being stored in more than one R register location to provide the additional needed binary information. Similarly, the image can be contracted by shifting the unknown image faster than the result image, the extra R-bits being lost rather than being stored.

As noted previously, the 3 × 3 block of unknown data consists of a central bit $U_8$ together with its eight neighbors $U_\phi$ –$U_7$. As will become apparent from a consideration of FIG. 10(*b*), in order to generate the result bit $R_8$, the central bit $U_8$ is assessed in terms of its eight neighbors $U_\phi$ –$U_7$, which are processed separately from $U_8$. The processing of the eight neighborhood bits $U_\phi$ –$U_7$ can conveniently be considered as the generation of successive sets of neighborhood signals, the functional transformation which generates each successive set being preselectable by means of a respective portion of the operation control parameter's stored in registers 54. As the design of a particular logic matrix to generate an output signal corresponding to defined logical combinations of given input signals is within the ordinary skill of one familiar with digital logic circuitry, the various logic matrices used in making these transformations are not illustrated in detail. Rather, these matrices are defined in terms of the logical combinations which they perform, expressed as Boolean functions.

Prior to considering the details of FIG. 10(*b*), it is pointed out that there are $2^{512}$ possible functions of a 3 × 3 neighborhood. To specify a completely general function would therefore require a 512-bit register, which is excessive in terms of parameter loading time and hardware complexity. A considerable reduction in control logic can be obtained by treating the center bit ($U_8$ in our terminology) separately from its eight neighbors. One could then specify any function of the 8-bit neighborhood with 256 control bits. The resulting one-bit predicate can then be combined with the $U_8$ bit in $2^4$ ways, which can be specified by a four-bit register. These 260 bits are still far too numerous. In accordance with the present invention, a compact but powerful subset of these $2^{260}$ functions has been selected. This subset involves a general form of neighborhood majority logic. The allowed functions depend on the population, or one's count, of the eight-bit neighborhood and certain modified forms of it.

Initially, the U-neighborhood ($U_\phi$ –$U_7$) of FIG. 3 may be modified selectively by the substitution of the three corresponding bits from the previously generated result word, i.e. bits $RO_\phi$ –$RO_2$ in place of the three bits $U_\phi$ –$U_2$ in the left hand column of the 3 × 3 array. This substitution is performed by a logic matrix 210 when a control bit designated CWN is present. For future reference, the array of eight signals so generated is designated the V-neighborhood and comprises individual signals designated $V_\phi$ –$V_7$. These signals are defined in conventional Boolean form in accordance with Table 1 below. As may be seen, in the absence of the CWN operational control bit, the V-neighborhood is identical with the original U-neighborhood.

TABLE 1

$$V_\phi = CWN \cdot R_\phi + \overline{CWN} \cdot U_\phi$$
$$V_1 = CWN \cdot R_1 + \overline{CWN} \cdot U_1$$
$$V_2 = CWN \cdot R_2 + \overline{CWN} \cdot U_2$$
$$V_3 = U_3$$
$$V_4 = U_4$$
$$V_5 = U_5$$
$$V_6 = U_6$$
$$V_7 = U_7$$

An array of eight signals, designated the W-neighborhood, is formed in the following manner. For each of the even V-neighborhood signals, $V_\phi$, $V_2$, $V_4$, and $V_6$, there is generated, in a logic matrix 212, a corresponding W-neighborhood signal which is either identical with the respective V-neighborhood signal or is a predetermined logical combination of the respective V-neighborhood signal with two of its neighbors, e.g. $W_N = f(V_N, V_{N-1}, V_{N+1})$. The selection is made by means of an operation control parameter bit, designated CON. Typically, logic matrix 212 would be configured to implement the equations defined in Tables 2 and 3:

TABLE 2

$W_{\phi} = (V_{\phi} + V_7)\cdot\overline{V_1}CON + \overline{CON}\cdot V$
$W_2 = (V_2 + V_1)\cdot\overline{V_3}\ CON + \overline{CON}\cdot V_2$
$W_4 = (V_4 + V_3)\cdot\overline{V_5}\ CON + \overline{CON}\cdot V_4$
$W_6 = (V_6 + V_5)\cdot\overline{V_7}\ CON + \overline{CON}\cdot V_6$ Table 2 defines the equations for producing the even W neighborhood signals. Also, for each of the odd V-neighborhood signals, $V_1$, $V_3$, $V_5$ and $V_7$, there is generated a corresponding W-neighborhood signal which is either identical with the respective V-neighborhood signal or is a somewhat differently formed logical function of the respective V-neighborhood signal and two of its neighbors. The selection is again a function of the control parameter bit CON. These four signals are defined in Table 3 as follows.

TABLE 3

$W_1 = (\overline{V_7} + \overline{V_0})\cdot V_1\cdot CON + \overline{CON}\cdot V_1$
$W_3 = (\overline{V_1} + \overline{V_2})\cdot V_3\ CON + \overline{CON}\cdot V_3$
$W_5 = (\overline{V_3} + \overline{V_4})\cdot V_5\ CON + \overline{CON}\cdot V_5$
$W_7 = (\overline{V_5} + \overline{V_6})\cdot V_7\ CON + \overline{CON}\cdot V_7$ As will be developed in greater detail hereinafter, the particular logical functions which may be substituted for each V-neighborhood signal are related to the determination of the Euler number of connectivity of the overall image and the effect on this connectivity which may be exercised by changing the central bit ($U_8$) of any given 3 × 3 neighborhood ($U_{\phi}$ –$U_7$) of the unknown image. This effect is denoted "Euler differential".

An array of eight signals, designated the X-neighborhood, is formed in a logic matrix 214 by the combination of the W-neighborhood signals with two 8-bit operational control parameters, designated NMT and NSL. The individual bits in each of these parameters correspond to respective ones of the neighborhood signals, i.e. the parameter NMT comprises eight individual bits $NMT_N$ for N = 0 through 7. The X-neighborhood signals are generated according to the following Boolean relationship:

$$X_N = W_N\cdot NSL_N \oplus NMT_N$$

where the symbol ⊕ represents the exclusive OR function.

From this relationship, it can be seen that, by loading appropriate operation control parameters into registers 54, each bit in the neighborhood can be either set to a desired or preselected value, independently of the corresponding W-neighborhood signal, or it can be a selected function of the respective W-neighborhood signal. For example, if the NMT bits are set in a particular selected pattern and if all the NSL bits are one, the number of ones present in the X-neighborhood array of signals will depend upon the extent or degree of coincidence between the W-neighborhood array and the preselected NMT bit pattern. Likewise, selected bit positions can be effectively shut off, e.g. so that only the even W-neighborhood signals can produce a result bit in the X-neighborhood.

The number of ones present in the X-neighborhood is counted, as indicated at 216 in FIG. 10(*b*) and the count is read out in a one-out-of-nine code. In other words, nine output signals ($C_{\phi}$–$C_8$) are provided and a "one" is generated on only that signal lead which corresponds to the value of the count, i.e. the number of ones present in the entire X-neighborhood array of signals. The remaining eight signals are "zeros". The nine signals provided by the counter 216 are combined in a logic matrix 218 with a 9-bit operational control parameter, designated NTR, according to the following Boolean function, to provide a single-bit signal designated the P-bit.

$$P = C_{\phi}\cdot NTR_{\phi} + C_1\cdot NTR_1 + C_2\cdot NTR_2 + \ldots + C_8\cdot NTR_8$$

where $NTR_{\phi}$– $NTR_8$ are the nine individual bits making up the parameter NTR.

Since the one-out-of-nine code represents the number of "ones" in the X-neighborhood, the 9-bit control parameter NTR can provide a thresholding operation on this number. By setting all of the NTR bits which correspond to values below the selected threshold to "zero" and setting the other NTR bits to "one", the P-bit will be a "one" only if the number of "ones" in the X-neighborhood is above the threshold. However, since the NTR parameter is combined with a set of signals which are in a one-out-of-nine code, the P-bit can also be caused to indicate whether the number of ones in the Y-neighborhood is any one of a plurality of arbitrarily selected discrete values. As is explained hereinafter, this property is useful in making various connectivity determinations for image analysis and modification.

The P-bit is then combined with the sampled mask or known bit (M) and with the central bit of the unknown sample block ($U_8$) in a logic matrix 220 to generate the R-bit according to the following Boolean expression:

$$\begin{aligned} R8 = {} & \overline{U_8}\,\overline{MP}\cdot BSL_0 \\ & + \overline{U_8}\,\overline{MP}\cdot BSL_1 \\ & + \overline{U_8}\,\overline{MP}\cdot BSL_2 \\ & + \overline{U_8}\,MP\cdot BSL_3 \\ & + U_8\,\overline{MP}\cdot BSL_4 \\ & + U_8\,\overline{MP}\cdot BSL_5 \\ & + U_8\,\overline{MP}\cdot BSL_6 \\ & + U_8\,MP\cdot BSL_7 \end{aligned}$$

where $BSL_{\phi}$– $BSL_7$ are the individual bits of an eight bit operation control parameter, designated generally as BSL. Since BSL has $2^8$ possible states, all $2^{2^3}$ possible Boolean functions of $U_8$, M, and P can be generated. The R-bit is then applied to the register 82 as illustrated in FIG. 4. The R-bit is denoted $R_8$ to indicate that, in binary mode, it normally corresponds in position to the central bit $U_8$ of the U-neighborhood, as shown in FIG. 3. As the construction of a logic array or matrix which would form the various signal combinations defined in Tables 1, 2, 3 and 4 and the P and R signals would depend upon the type of compatible electronic logic systems used, no particular detailed construction has been illustrated, as noted previously.

As an example of neighborhood processing, suppose we want to do an image cleanup wherein scattered ones are to be removed. That is, the result bit $R_8$ is to equal $U_8$ except when $U_8 = 1$ and it has seven or eight zero neighbors. First, we make P = 1 for cells having zero through six one-neighbors, by setting $NTR_0 = \ldots = NTR_6 = 1$. (In octal, NTR = 774.) Next, we want $R = U_8\cdot P$; this is obtained with $BSL_5 = BSL_7 = 1$. (In octal, BSL = 5.) For this example, as in most applications, CWN = CON = NMT = 0 and NSL = 11111111 (377 octal).

In addition to generating and storing the result image, the image processor of the present invention also analyses or measures certain characteristics of the result image, simultaneously with its creation by examining a block of sample data represented in FIG. 3 and comprised of four bits $R_0$, $R_1$, $R_7$, and $R_8$. The four bit block of sample data thereby obtained is applied to a result analysis network 84 including a logic matrix 230 (FIG. 10) which provides five output signals $\Delta RQ_1$, $\Delta RQ_2$, $\Delta RQ_3$, $\Delta RQ_4$ and $\Delta RAR$ which are generated from the four sample bits in accordance with the Boolean functions given in Table 4.

TABLE 4

$$\Delta RQ_1 = \overline{R_0}\,\overline{R_1}\,\overline{R_7}\,R_8 + \overline{R_0}\,\overline{R_1}\,R_7\,\overline{R_8} + \overline{R_0}\,R_1\,\overline{R_7}\,\overline{R_8} + R_0\,\overline{R_1}\,\overline{R_7}\,\overline{R_8}$$

$$\Delta RQ_2 = R_0\,R_1\,\overline{R_7}\,\overline{R_8} + \overline{R_0}\,\overline{R_1}\,R_7\,R_8 + R_0\,\overline{R_1}\,\overline{R_7}\,R_8 + \overline{R_0}\,R_1\,R_7\,\overline{R_8}$$

$$\Delta RQ_3 = R_0\,R_1\,R_7\,\overline{R_8} + R_0\,R_1\,\overline{R_7}\,R_8 + R_0\,\overline{R_1}\,R_7\,R_8 + \overline{R_0}\,R_1\,R_7\,R_8$$

$$\Delta RQ_4 = R_0\,R_1\,R_7\,R_8$$

$$\Delta RAR = R_8$$

These signals are applied to respective counters $\mathbf{232_1}$ – $\mathbf{232_5}$ which count the number of times a "one" occurs in the respective signal as an entire image is scanned. The generation of a "one" in one of the signals $\Delta RQ_1$, $\Delta RQ_2$, $\Delta RQ_3$ and $\Delta RQ_4$ indicates the occurrence of a respective type of data pattern in the 2 × 2 bit sample block. Thus, these counts accumulated by the counters $\mathbf{232_1}$–$\mathbf{232_5}$ may be represented in a semi-graphical form as shown in Table 5 below.

TABLE 5

$$RQ_1 = n\begin{pmatrix}00\\01\end{pmatrix} + n\begin{pmatrix}01\\00\end{pmatrix} + n\begin{pmatrix}10\\00\end{pmatrix} + n\begin{pmatrix}00\\00\end{pmatrix}$$

$$RQ_2 = n\begin{pmatrix}00\\11\end{pmatrix} + n\begin{pmatrix}01\\01\end{pmatrix} + n\begin{pmatrix}11\\00\end{pmatrix} + n\begin{pmatrix}10\\10\end{pmatrix}$$

$$RQ_3 = n\begin{pmatrix}11\\10\end{pmatrix} + n\begin{pmatrix}10\\11\end{pmatrix} + n\begin{pmatrix}01\\11\end{pmatrix} + n\begin{pmatrix}11\\01\end{pmatrix}$$

$$RQ_4 = n\begin{pmatrix}11\\11\end{pmatrix}$$

From the foregoing, it may be seen that the count ($RQ_1$) accumulated by the first counter $\mathbf{232_1}$ may be characterized as indicating the number of "outside" corners which occur in the result image; the count ($RQ_2$) accumulated in the second counter $\mathbf{232_2}$ may be characterized as indicating the number of units of "side edge" to be found in the result image; the count ($RQ_3$) accumulated in the third counter $\mathbf{232_3}$ may be characterized in indicating the number of "inside" corners occurring in the result image; and the count ($RQ_4$) accumulated in the fourth counter $\mathbf{232_4}$ indicates the number of "solid blocks" occurring in the result image. The count (RAR) accumulated in the last counter $\mathbf{232_5}$ is merely the total number of "ones" or image points occurring in the entire result image. FIG. 7 illustrates the values of the result counts RAR and $RQ_1$–$RQ_4$ for the result image illustrated.

The various counts accumulated in the counters $\mathbf{232_1}$–$\mathbf{232_5}$ are provided to the memory bus 22 so that they can be stored in the memory 21 for later use in the performance of image analysis by the CPU 24, as is explained in greater detail hereinafter. In addition to the more directly measured quantities $RQ_1$, $RQ_2$, $RQ_3$, $RQ_4$ and RAR, another quantity RQD may be defined which represents the number of "diagonal contacts", that is:

$$RQD = n\begin{pmatrix}01\\10\end{pmatrix} + n\begin{pmatrix}10\\01\end{pmatrix}$$

This quantity may be found from the following relationship.

$$RAR = \frac{RQ_1}{4} + \frac{RQ_2}{2} + \frac{RQD}{2} + \frac{3RQ_3}{4} + RQ_4$$

It is desirable, when computing the counts $RQ_1$, . . . ,$RQ_4$, to include those 2 × 2 blocks lying on the edge of the R array. If not all four bits in the block lie within the actual R array, the remaining bits are set to ROT, which is an operation control bit. Thus the number of 2 × 2 blocks counted is (BTS+1)·(WDS+1).

An additional quantity $RQ_0$ can be defined as $$RQ_0 = n\begin{pmatrix}00\\00\end{pmatrix}$$

It can be computed indirectly as follows: $RQ_0 + RQ_1 + RQ_2 + RQD + RQ_3 + RQ_4 = (BTS+1)\cdot(WDS+1)$ The result analysis logic 84 and result counters 86 preferably further include transition counters (not shown) which develop two counts, denoted WZT and ZWT. When the image process is completed and the entire result image generated, count WZT defines the word axis coordinate of the first all zero column immediately following a non all zero column. Similarly, count ZWT defines the coordinate of the first all zero column immediately followed by a non all zero column. These transition counters are used particularly in optical character recognition applications. In such applications, the result image frequently contains several printed characters with the bit axis corresponding to the vertical direction on a printed page and the word axis corresponding to the horizontal axis on a printed line. The transition counters are useful in locating the beginning and end of characters.

EXAMPLES AND APPLICATIONS

The foregoing description has related mainly to the design and construction of apparatus according to the present invention rather than to examples of applications for demonstrating the utility of such apparatus. While it will be apparent to those skilled in the fields of topology, optical character reading, and image analysis that the information provided by the disclosed apparatus is useful in identifying, manipulating, and analyzing images presented to it in binary form, the following examples of image processes which may be performed using this apparatus will further serve to illustrate the usefulness of this apparatus and its preferred mode of operation.

One of the simpler but more useful functions of the illustrated apparatus is to identify unknown images in relation to known images or masks. The known images may be stored in memory so as to constitute a reference file. The comparison of unknown and known images proceeds in straightforward fashion when arrays of binary data representing individual characters, e.g. printed letters or numbers properly scanned and oriented, are stored in memory at respective discrete locations. An individual array of data representing an unknown image can then be scanned through the registers 87, 88, 89 (FIG. 8(*a*)) in synchronism with the scanning of data representing a selected known image or mask through the register 97. The counters 202 (FIG. 10) will then be incremented to counts representing the degree of correlation between the known and unknown images for respective shifted or unshifted relative positions. A mismatch count developed by using exclusive-OR correlation, below a certain level can then be accepted as a match, or a series of masks can be run and the best correlation count obtained can be accepted as indicating an acceptable match. As is understood, predictive analysis of a word or sentence under control of the computer program can be used to select which masks are tried first so as to reduce, on a statistical basis, the number of masks which need to be tried.

Since each bit of the data array representing the known image is compared not only with the central or main bit ($U_8$) of the 3 × 3 sample block of unknown data, but also with each of its eight immediate neighbors ($U_0$–$U_7$), the several correlations being obtained independently, a correlation count is obtained, not only for the presumably aligned positions of the two images being compared, but also for eight laterally shifted positions. Thus, a check on registration is obtained and corrective measures can be applied as needed, e.g. either through the original scanning process which obtains the binary data representing the image, or by means of further BIP correlation passes in which the same unknown and mask are used but, for example, UWA and UBA are changed slightly to effect a different position of U relative to M.

As mentioned previously, the result image generated and stored during the scanning of an unknown image may be an image which is an improved version of the original unknown image. Thus, characteristics of the original unknown image can be determined by analyzing the result image. If desired, the result image can in face be made identical to the original unknown image by proper selection of the result code parameters.

The length of the perimeter of a given result image can be obtained in the following way. Since the $RQ_2$ counter (FIG. 10(*d*)) is incremented each time a 2 × 2 neighborhood is encountered which comprises two ones which are side by side in an array which contains no other ones, each unit in the $RQ_2$ counter can be considered as contributing one unit of perimeter. The $RQ_1$ counter is incremented each time a 2 × 2 neighborhood is encountered which contains only a single one. Since the single one is necessarily at a corner of the 2 × 2 array facing three zeros, the perimeter is necessarily turning a corner at this point. The effective contribution to the perimeter can conveniently be considered to be the diagonal across the single bit, i.e.

$$\frac{1}{\sqrt{2}}$$

units of perimeter. Likewise, the type of 2 × 2 neighborhood which increments the $RQ_3$ counter can likewise be considered to be at a corner of the image and thus each increment of count in this counter can likewise be considered as making $$\frac{1}{\sqrt{2}}$$

units of perimeter contribution to the total. The total length of the perimeter of an image (P) can therefore be determined by evaluating the quantity $$P = RQ_2 + \frac{RQ_1 + RQ_3}{\sqrt{2}}.$$

This determination can be made using the generalized computational abilities of the computer 11. Considering a given result image to be made up of lines as opposed to large masses of "ones" or image points, the average line length ($L_L$) may be taken as being half the perimeter length to a first approximation, i.e.

$$L_L = \frac{P}{2}.$$

While the counter $RQ_1$, $RQ_2$, $RQ_3$ and $RQ_4$ indicate the frequency of occurrence of various patterns in the 2 × 2 block of data sampled from the result image, the count provided by the RAR counter is merely an indication of the total number of ones in the result image. Thus, this count can be considered as defining the overall weight or "mass" of the image. Having the average line length of an image as well as its "mass", the average line width $\overline{W}$ can be then obtained to a first approximation by dividing the RAR count by the average line length. One way of evaluating an image to see if it is suitable for optical character reading purposes, i.e. for comparison with masks, is to evaluate the average line thickness. With a given set of masks, the average line thickness should lie between predictable limits to obtain satisfactory correlation results.

Another use of the quantities measured by counters 232 (FIG. 10) is in determining the relative number of bodies (B) and holes (H) in a given image. In making such an analysis, it is useful to contemplate tracing of the perimeter of each body in a clockwise direction, each body and hole being made up of square elements in the result image. From the quasi-graphical definitions of the signals used to increment the counters 232 given in Table 5, it can be seen that the $RQ_1$ counter will be incremented for each right hand turn made in tracing a perimeter clockwise and that the $RQ_3$ counter will be incremented once for each left hand turn made in tracing the perimeter clockwise. By tracing the perimeter clockwise is meant that the interior of the perimeter is on the right during the tracing. In a closed perimeter surrounding a single body it can be seen that the number of right hand turns will be four more than the number of left hand turns. In other words, for a single body's outer perimeter, $RQ_1=RQ_3+4$. Similarly, for the perimeter of a single hole $RQ_3=RQ_1+4$. While the counts provided by the counters 232 will not, by themselves, define either the absolute number of bodies (B) or holes (H) in an image, the quantity B-H, which is for present purposes called "Euler number", E, is defined as follows:

$$E=B-H=\frac{RQ_1-RQ_3}{\sqrt{4}}.$$

This and related formulas are derived rigorously in S. B. Gray, "Local Properties of Binary Images in Two Dimensions", IEEE Transactions on Computers, May 1971.

In general, it may be noted that one way of evaluating an image to see whether it is suitable for correlation with a series of masks for optical character reading purposes is to evaluate the Euler number B-H. If the Euler number lies between say −2 and +3, it provides a resonably acceptable verification that a good one-character image is represented by the data array. On the other hand, if the Euler number lies outside these bounds, this information typically indicates that the image has been fragmented or that there are a number of extraneous spots ("noise") in the image and that the image should be further developed, refined, or modified to enhance the probability that it can be correctly identified.

Another measure which can indicate "noise" in the image is an usually high quantity of RQD. Since this quantity is a measure of "diagonal touchings" or "almost touching", it can be seen that a large number of small, closely adjacent fragments will cause this quantity to be relatively high. Similarly, in making an initial or trial scan of an image, a high value for this quantity indicates that the scan was at too low a resolution setting so that the scan could not adequately resolve the separations between image elements.

Figure 11:
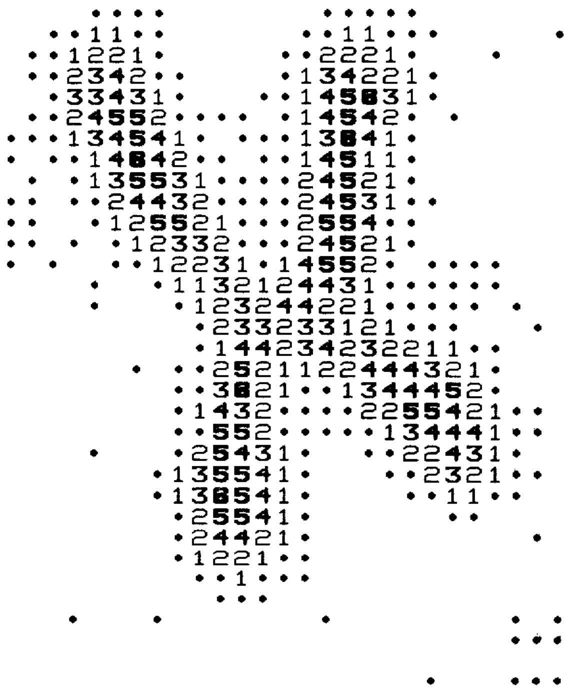
FIG. 11 represents a mapping of a typical density mode image.

In FIG. 11, a gray-scale picture of a typical human chromosome is given, which is to be optically converted to a binary image. The heavy "6" represents all points having density (gray level) of 6 units or greater; "5" represents points of density 5 or more but less than 6. Similarly for the other digits; dots represents points denser than 0.

In processing the image of FIG. 11, the BIP typically would first operate in the density mode to convert the gray scale image to a binary image. Generally, different threshold values are utilized, as represented in Table 6, with each different threshold producing a different result image. As each result image is produced, it is subjected to a 2 × 2 neighborhood analysis so that the result counts RAR and $RQ_1$–$RQ_4$ are developed. These result counts for each result image are stored in memory allowing the CPU24 to use them to calculate the derived parameters E (Euler number), $L_L$ (line length), and $\overline{\overline{W}}$ (average line width). Thus, the CPU is able to produce in memory data corresponding to that shown in Table 6.

| Threshold | Area | Line Length | Av. Line Width | Euler No. |
|---|---|---|---|---|
| 0 | 456 | 102 | 4.5 | 15 |
| 1 | 242 | 58 | 4.2 | 1.0 |
| 2 | 176 | 57 | 3.1 | 0.5 |
| 3 | 113 | 56 | 2.0 | 3.5 |
| 4 | 79 | 47 | 1.7 | 5.5 |
| 5 | 34 | 32 | 1.1 | 6.5 |
| 6 | 5 | 7 | 0.7 | 5.0 |

After the CPU24 produces the data of Table 6, it executes a "reasonableness" test to select the most appropriate threshold. The reasonableness test is defined by a program formulation which calculates a quality or reasonableness factor using the values of Table 6 weighted in an appropriate manner. For a reasonable object, a suitable threshold is characterized by a near-zero Euler number, line width appropriate to image type and scale of scan, and by line length being a "slow" function of threshold. With reference to Table 6, the reasonableness test, for example, would exclude threshold 0 because of an excessively high Euler number which could not possibly characterize a good picture of one chromosome. Thresholds 3 and above have Euler numbers which are also too high and further have line widths which are not appropriate to the known scale of chromosomes and the known scale used in scanning them. Thus, the reasonableness test would indicate that threshold 1 or 2 yields the binary image most likely to be a good picture of a chromosome.

The unknown image is modified under the control of the result code which determines the generation of the R-bit (i.e. $R_8$ in FIG. 10(*b*)) signal which, in turn, forms the result image. One modification which can be applied to the unknown image affects the generation of the result image in such a way as to broaden portions of the image, i.e. to, in effect, "smear" the image. As noted previously the X-neighborhood (FIG. 10(*b*)) can be thresholded by the ones' counter 218 and the logic matrix 220 so that the P-bit is a "one" whenever the X-neighborhood contains more than a predetermined number of ones. By causing the X-neighborhood to be identical with the original unknown neighborhood, by setting a relatively low threshold, and by using the P-bit itself for the R-bit, a result image will be generated in which the image elements are in effect broadened or spread out. Thus, if an image is fragmented by small breaks, the broadening will cause these breaks to be closed in so that the number of bodies present is substantially reduced. The image elements can similarly be thinned or reduced by setting a relatively high threshold. However, as will appear hereinafter, another method of thinning image components or lines is also available and this other method is preferred in most instances.

In an optical character reading system operating in real time, that is, with the image scanning being performed essentially contemporaneously with the character recognition and analysis, the ability to smear an image is also useful in locating a page edge or a line within a page. During such an operation, the scanner is operated with a relatively large field so that it looks at an area much larger than a single character. By using the smearing technique just described, a line of characters may be made to appear as a solid bar even though the scanner itself is sharply focussed. In other words, the image processor itself can simulate an out-of-focus scan. Further, since the processor works at electronic speed, such a modification of the image can be accomplished faster using the processor than by correspondingly controlling the operation, e.g. focus, of the optical scanner.

As noted previously, the group of signals which constitute the W-neighborhood (FIG. 10(*b*)) can be selectively modified under the control of the operational control bit CON so as to constitute functions which are useful in determining the Euler differential ΔE which is the change in image Euler number which occurs if the central bit U8 is changed from 0 to 1. The connectivity of the image may be defined in either of two distinct ways, plus a third way which is a combination of the first two. Considering a 2 × 2 neighborhood, containing two "ones" touching only at a corner, the connectivity of the image containing this block can be defined in a first manner in which the two "ones" are considered to be connected. This is referred to as W-type Euler number or connectivity. If the "zeros" are considered to be connected, (so that the "ones" are considered to be not connected) the second type of conductivity is arbitrarily designated Z-type Euler number or connectivity. In either case, the Euler number or connectivity (E) is taken to be the quantity B-H defined previously with reference to the result image characteristic counters 101–105. A suitable subscript is used to indicate which type of connectivity is meant, i.e. $E_w$ for W-type connectivity and $E_z$ for Z-type connectivity.

The effect which any selected central sample bit ($U_8$) may have upon the connectivity of an image is defined as ΔE (Euler differential), i.e. the difference between the connectivity which exists if the central bit is a one ($E_1$) and the connectivity which exists if the central bit is a zero ($E_0$). Expressed as a formula:

$$\Delta E = E_1 - E_0$$

Further subscripts may be used in addition to indicate whether Z-type or W-type connectivity is referred to.

It can be shown mathematicalaly that $\Delta E_z$ and $\Delta E_w$ can have only certain discrete values, i.e. −3, −2, −1, 0 and +1. It may further be shown that the effect (ΔE) which a given central bit ($U_8$) may have upon the connectivity of an entire image may be determined from the 8-bit U-neighborhood ($U_0$–$U_7$) alone, i.e. without looking at the central bit itself. This follows from considering that the central bit is a possible member of each of four 2 × 2 neighborhoods. In order to determine $\Delta E_w$ for a given U-neighborhood, the W-neighborhood is generated in the connectivity mode, i.e. the operation control parameter CON is set a "one" and the NMT and NSL parameters are selected so that only te even X-neighborhood positions $X_0$, $X_2$, $X_4$ and $X_6$ are active, as described previously. It can then be mathemtically shown (See S. B. Gray, "Local Properties of Binary Images in Two Dimensions", IEEE Transactions on Computers, May 1971), that the count determined by the ones counter 216 is equal to $1 - \Delta E_w$. Using the 9-bit control quantity NTR it is then possible to determine if the $\Delta E_w$ value so determined is one of a specific set of values or is any value other than zero. A P-bit can thus be generated accordingly. Thus, the formation of the result image is influenced by whether each particular central sample bit ($U_8$) can affect the W-type connectivity of the image in a particular way.

If it is desired to determine the effect of the central bit on Z-type connectivity, the NMT and NSL parameters are selected so that only the odd X-neighborhood positions ($X_1$, $X_3$, $X_5$ and $X_7$) are active. It can then be shown that the count determined by the ones counter 216 is equal to $1 - \Delta E_z$.

As the P-bit can be controlled as a function of the effect which the central bit $U_8$ can have upon the connectivity, and since each result bit can be influenced as any desired function of the P-bit, it can be seen that a result image can be generated which is similar to the original unknown image except that all bits which could not affect the connectivity of the overall image are dropped. As will be understood by those skilled in the field of topology, the dropping of bits which cannot affect the connectivity of the image will, in effect, thin the lines of a line image but will not break any lines since the dropping of any bit which would constitute a breaking of a line would change the Euler number and thus have non zero Euler differential. Thus, by repeatedly generating result images in this way and using each result image as the next unknown image, a line image can be gradually refined until each of the lines forming the image is only a single bit in width. The average line width can be computed, as described previously, to determine the general effect such treatment has on the image being processed.

Figure 12A:
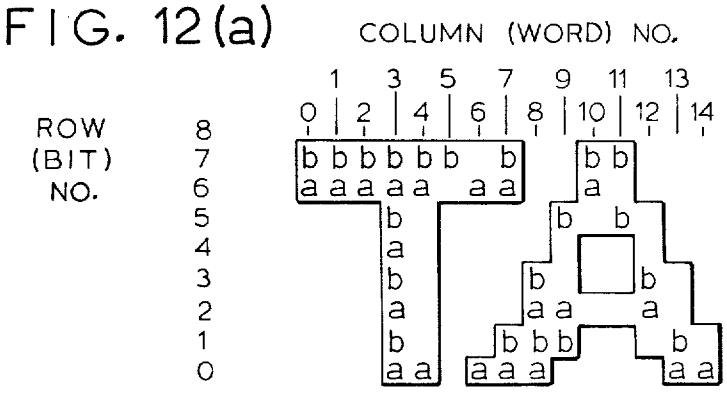
FIG. 12(*a*) and (*b*) are mappings illustrative of typical image processing employed in character recognition applications.
Figure 10C:
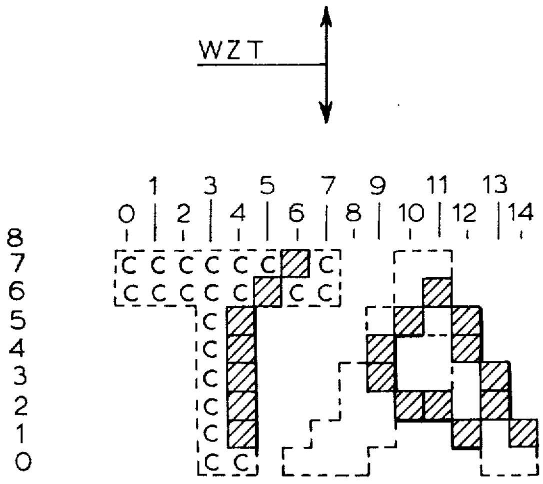
Figure 10D:
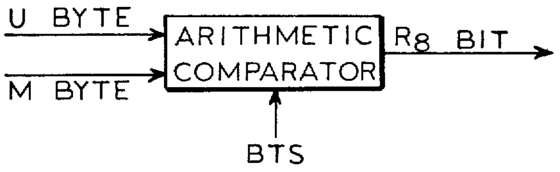
Figure 12B:
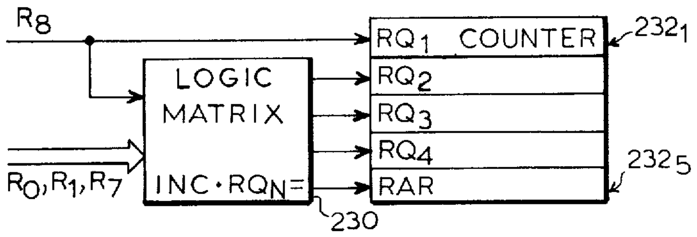

An exemplary optical character recognition application is depicted in FIG. 12(*a*) which shows, in simplified form, a common problem wherein two adjacent printed characters overlap but do not touch. It is required to detect that they do not touch, and further to supply the T image (columns 0–7) to the subsequent correlation process with the bits belonging to the A having been removed, and conversely.

The first BIP pass, denoted "*a*", will perform a skeletonizing operation on the entire image (columns 0–14) moving left to right. Mode bit CON will be used so that bits having a zero Euler differential can be found and removed. Mode bit CWN is used so that bits' leftward neighbors (number 0, 1 and 2 in FIG. 3) will come from the result or new, array rather than the unmodified unknown. It will be understood that two adjacent bits, such as those at coordinates 65 and 75 (row-column), may each separately by removable without breaking connectivity, but if removed together, may change connectivity (of the T in this case). For this reason, the first BIP pass allows removal of bits only in rows 0, 2, 4, and 6. As discussed previously, registers NSL and NTR can be set so that the P bit is 1 for every cell which does not contribute to, for example, the W- connectivity of the array. To permit removal in one pass of bits only on the even-numbered rows, we create one word in memory having ones only in bits 0, 2, 4, 6, 8 etc. Parameter MWA is set equal to the address of this word, and mode bit SMW is set to allow repeated use of this one word. Now BSL can be set to that value which transforms O's in U into 0's in R, and transforms 1's in U into O's in R if M=1 and P=1. Other relevant control parameters which must be set are: UWA, which must point to the first address (image column) shown: RWA, which can be equal to UWA or point to another "working buffer" in memory; and BTS and WDS, which for this example can be 8 and 15 respectively.

Having established the appropriate parameters, image process "*a*" itself is started, moving left to right. The 1 in cell 60 is in an even row and has zero W- differential, hence is reset. This is denoted by the letter "a". Next the bit in cell 61 is reset, followed by 62. Cell 63 also has zero W- differential, because its left neighbor, in CWN mode, is 62, which has already been reset. Also in the column, bits 03, 23, and 43 are reset. In the next column, bits 24 and 44 may not be reset without creating W- breaks, but cell 64 may be, because character W- connectivity is preserved by the corner connection 54–65.

When pass "*a*" is finished, pass "*b*" is performed on the result of "A", which is identical except that removal of bits lying only on odd rows is allowed. This can be achieved either by changing BSL appropriately or by setting MBA=1, which causes the sequence of M bits to be 0, 1, 0, 1, etc., instead of 1, 0, 1, 0, . . . . Bits "*b*" are thus removed. It will be observed that the "cumulative skeletons" thus generated are topologically identical to the original, in that the connectivity of each character is preserved, as is the discontinuity between them. The discontinuity however is now wider, and contains all-zero words. Bits remaining in the skeleton resulting from passes "*a*" and "*b*" are indicated by cross-hatched squares in FIG. 12B.

Following pass "*b*", the first-nonzero-to-zero transition register, WZT, contains the number 7, which effectively is the end of the skeletonized "T". This value of WZT indicates to the CPU that the image contains a so-called "river" of white extending from top to bottom. The CPU then knowns that the characters can be separated, as described below, does some address arithmetic, and restarts the BIP. A third pass, denoted "C", is now performed, starting at the coordinate indicated by WZT and moving leftward. This pass will cumulatively grow or propogate the skeleton of the T, from right to left in a rapid fan-line fashion, simultaneously AND-ing this growing pattern with the original array. Parameters settings are as follows: UWA points to column 7 in the array resulting from pass *b;* RWA points to a "scratch" area of memory; MWA points to column 7 in the original array; NSL is set to select all 8 neighbors; NMT=0; NTR is set to cause P=1 whenever the neighborhood contains one or more ones; BSL is set to cause R=1 if M(U+P)=1; PUW=PMW=PRW=1 to cause backwards processing on the word axis; and CWN=1 which causes neighbors 0, 1, and 2 (which lie to the right of $U_8$ since PUW=1) to come from the news, or result, array.

Upon starting the image process, the first word to occupy the central position in the U logic is that denoted 7 in FIG. 12(*b*). Cells 67, 77 and 87 have at least one neighbor, producing three corresponding P=1 bits; the Boolean function M(U+P) is thus satisfied for cells 67 and 77. Added bits are denoted "C". Processing proceeds to columns 6, 5, 4, and 3. Cell 73 has no neighbors in the unknown, but since CWN=1, cells 64 and 74 cause the neighborhood of 73 to be non-empty. At the end of pass C, the Result array contains the entire "T" character with no extraneous or missing bits. This array is then subjected to the recognition procedure. Following this, the "A" is isolated simply by exclusive-ORing the isolated "T" with the original array. Finally, the "A" is recognized by the usual procedures.

It is pointed out that it is possible to define other relationships between W and V shown in Tables 2 and 3 for producing the $R_8$ bit (FIG. 10):

$$W_0 = V_0 + CON \cdot (V_7 + V_1)$$
$$W_2 = V_2 + CON \cdot (V_1 + V_3)$$
$$W_4 = V_4 + CON \cdot (V_3 + V_5)$$
$$W_6 = V_6 + CON \cdot (V_5 + V_7)$$
$$W_1 = V_1$$
$$W_3 = V_8$$
$$W_5 = V_5$$
$$W_7 = V_7$$

Then it can be shown mathematically that if CON=1, NSL=377, and NMT=125 (complementing neighbors $W_1$, $W_3$, $W_5$, $W_7$) then the count determined by ones-counter 218, denoted $|X|$, is equal to $5 - \Delta E_8$.

For the hexagonal lattice, we number the six neighborhood cells, clockwise, $U_0, U_1, \ldots, U_5$. The desired neighborhood transformation is $$W_0 = V_0\ \overline{(CON + \overline{V_7})}$$
$$W_1 = V_1\ \overline{(CON + \overline{V_0})}$$
$$W_2 = V_2\ \overline{(CON + \overline{V_1})}$$
$$W_3 = V_3\ \overline{(CON + \overline{V_2})}$$
$$W_4 = V_4\ \overline{(CON + \overline{V_3})}$$
$$W_5 = V_5\ \overline{(CON + \overline{V_4})}$$
$$W_6 = V_6\ \overline{(CON + \overline{V_5})}$$
$$W_7 = V_7\ \overline{(CON + \overline{V_6})}$$

Then if $\Delta E$ is the change in image Euler number caused by changing the central cell $U_6$ from 0 to 1, then if CON=1, it can be shown that $$\Delta E = 1 - |X|$$

where $|X|$ is the number of 1's in the X neighborhood, as counted by circuit 218.

A similar neighborhood transformation is possible for the lattice consisting of closely-packed equilateral triangles.

The connectivity mode of operation is also useful in determining those points at which lines cross or meet. After a line image has been thinned so that all lines are essentially only a single bit in width, the point at which two lines cross can be readily identified because the bit at this point will have a $\Delta E_z$ equal to −3. If one line merely meets another, i.e. a T-shaped intersection, then $\Delta E$ will be −2. After a line image has been thinned down so that all lines are only one bit wide, the end points of lines can be readily identified since these are the only bits whose $\Delta E$ value is zero. As will be understood by those skilled in the topology and optical character reading arts, this information, which is a type of feature extraction, can be highly useful in defining, characterizing and analyzing unknown images. As will be understood, image points having a particular value of $\Delta E$ can be identified by selecting the NTR parameter so that only that ones count corresponding to the desired $\Delta E$ will cause a P-bit to be produced.

While the analysis and characterization of images may be useful for optical character reading purposes when mere correlation with masks is inadequate, it should be understood that these types of analysis are also useful in other fields. For example, in the analysis of engineering drawings for facsimile transmission without highly redundant scanning of redundant information, the determination of end points and crossing points of various line segments is highly useful in defining those line segments so that they can be recreated after transmission without a conventional high resolution scanning process.

The use of special purpose masks or known images for use in modifying or analyzing an unknown image was mentioned briefly earlier in the specification. One particularly useful special-purpose mask is one having a density which is graded along one or the other of the two axes, i.e. a mask which has a very thin scattering of "ones" along one edge and a very dense distribution of "ones" along the other edge with a linear gradation of density therebetween. If such a mask image is correlated with the unknown image, a correlation count is generated which counts the correlation of the mask bit with the unknown bit, which may be considered to be the "weighted" mass of the image. In other words, the contribution of portions of the unknown image which are on the dense side of the mask image will be relatively greater than the contribution of those portions of the unknown image which are on the light or thin side of the mask image. Accordingly, by dividing the weighted mass by the mass of the original unknown image, a value is obtained which is, in effect, the fractional distance of the center of gravity along the axis of mask gradation.

For example, if the mask is considered to be graded from left to right and the weighted mass divided by unweighted mass is 0.6, this means that the center of gravity of the image is located 3/5 of the way from left to right across the entire image width. The center of gravity along the other axis can be determined in similar manner. The obtaining of the center of gravity is one more bit of information about the unknown image which may be used in identifying or analyzing it when the unknown image is of such a character that it cannot be merely correlated against predetermined known masks. Further, this information may be useful in establishing initial registration between unknown images and masks.

The correlation counter 202 can also be used to correlate the unknown image with itself in each of eight shifted positions. If the $U_8$ bit is used in place of the M bit, which may be provided for by an appropriate operating parameter selection each of the neighborhood counters 71–77 will accumulate a count which represents the correlation of the unknown image with itself for a correspondingly shifted position, i.e. $\Delta CC_n = U_8 \cdot U_N$. The last counter ($CC_8$) will accumulate a count equal to the mass of the image, i.e. the total number of "ones" in the entire image, since it correlates the unknown image with itself. If the image is made up of mainly vertical lines, the counts corresponding to the vertically displaced positions will be only slightly different from the mass value while the counts corresponding to the horizontally displaced positions will be widely different from this value. Thus, these counters can provide information which enables the program to determine if the image has more horizontal edge length than vertical edge length and vice versa. In the simple case in which the image is all "ones" on one side of a diagonal line and all zeros on the other side, the correlation counters can provide information defining the angle of the line ($\theta$) according to the following relationship.

$$\tan \theta = \frac{CC_8 - [CC_1 + CC_5]}{CC_3 + CC_7}$$

This situation may exist when the edge of a page is being scanned and it is desired to determine the orientation of the page so that the scan can be corrected to give the desired horizontala scanning axis.

While the various operations of image transformation and modification and of correlation and analysis could be performed by various general purpose computers known in the art, the program required to develop the same quantity of data would require many iterative loops. Thus, the overall operation would be quite slow as compared with the operation of the present apparatus which, by simultaneously developing various correlation and result image character counts and generating a refined or modified result image, operates relatively quickly. Thus, using of the apparatus of the present invention it is possible to process image data at a rate which makes the use of memory stored masks feasible and which makes it possible to operate an optical character recognition system in real time.

As various changes could be made in the above construction without departing from the scope of the invention, it should be understood that all matter contained in the above description or shown in the accompanying drawings shall be interpreted as illustrative and not in a limiting sense.

What is claimed is:

1. In apparatus for analyzing unknown images represented by binary data stored in a memory, an image processor comprising:

an unknown image data register for holding a plurality of bits comprising a portion of said unknown image data;

a result image data register;

a mask image data register for holding a plurality of bits comprising a portion of mask image data stored in said memory;

means for successively arithmetically comparing the magnitude of corresponding multiple bit bytes in said unknown and mask image data registers for generating a result bit in response to each comparison having a first value when said unknown data byte has a magnitude greater than said mask data byte and a second value when said mask data byte has a magnitude greater than or equal to said unknown data byte;

means for successively entering said result bits into said result image data register;

means for entering successive portions of said unknown and mask image data stored in said memory into said unknown and mask image data registers, respectively; and means for successively storing in said memory data from said result data register to thereby generate in said memory an array of data representing a result image which is a preselected logical modification of said unknown image.

2. An apparatus for analyzing unknown images in relation to known images, said unknown and known images being represented by respective arrays of binary data adapted to be arranged along first and second axes; an image processor comprising:

a plurality of unknown image data registers, each including a plurality of bit stages, for holding portions of said unknown data corresponding to successive lines spaced along said first axis;

a known image data register, including a plurality of bit stages, for holding known data corresponding in location within the respective images to one of the held lines of unknown data;

means for entering successive lines of known and unknown data into said known data register and one of said unknown data registers respectively and for entering into each of the other unknown data registers data from a preceding unknown data register in said series;

means defining a set of bit stages within said plurality of bit stages of said unknown image data registers and within said plurality of bit stages of said known image data register;

said unknown image data registers including means for scanning said defined set of bit stages therein in successive blocks, each block comprised of a subset of bit stages, to successively access groups of bits from each register;

said known image data register including means for scanning said defined set of bit stages therein bit by bit in synchronism with the scanning of said unknown image data registers;

means for generating a plurality of correlation signals, one for each bit position within a scanned block of said unknown data, each such correlation signal being a preselectable logical function of the respective bit of the unknown data in the scanned block and the single bit of known image data corresponding to the scanned block position;

a respective counter driven by each of said correlation signals; and means for reading out data from said counters, whereby the counts, accumulated by said counters as an array of unknown data is scanned, provide indications of the degree of similarity between the known and unknown images.

3. The apparatus of claim 2 including a parameter register storing binary control signals CUM, CUN, and CNM and wherein said plurality of unknown image data registers comprises three such registers and wherein said scanned blocks each includes three bits with the three bits respectively scanned in each register being designated $U_0$, $U_1$, $U_2$ and $U_3$, $U_8$, $U_7$, and $U_6$, $U_5$, $U_4$; and wherein the scanned bit of said known image data register is designated M; and wherein said means for generating correlation signals includes a logic matrix for generating signals $\Delta CC_0 - \Delta CC_8$ corresponding to the Boolean expression $\Delta CC_N = CUM \cdot U_N \cdot M + CUN \cdot U_N \cdot \overline{M} + CNM \cdot \overline{U}_N \cdot M$ for $N = 0–8$.

4. In an apparatus for analyzing an image represented by an array of binary data arranged along first and second axes, an image processor for determining the quantitative effect ($\Delta E$) of changing the state of each bit on the connectivity of the image, said image processor comprising:

a series of at least three image data registers for holding portions of said array corresponding respectively to successive lines spaced along said first axis, said registers including means for scanning, in successive blocks along said second axis, the data held in said registers, the blocks being of at least three bits extent on each of said axes with each successive block along said second axis being shifted from the preceding block by one bit, there being nine bit positions in each block and wherein the central bit position is identified as $U_8$, a corner bit position is identified as $U_0$ $U_1 - U_7$ respectively identify bit positions extending sequentially around the periphery of said block surrounding said central bit position;

means for entering successive lines of said array data into a first of said image data registers and for successively transferring data from said first image data register to a second of said image data registers and from said second image data register to a third of said image data registers;

logic means responsive to each data array block for generating a corresponding second block comprised of bits $W_0 - W_7$ where the position of each of bits $W_0 - W_7$ in each second block corresponds to the bit position $U_0 - U_7$ in a data array block respectively, and wherein $W_0 = (U_0 + U_7) \cdot \overline{U}_1$
$W_1 = (\overline{U}_7 + \overline{U}_0) \cdot U_1$
$W_2 = ({}_2 + U_1) \cdot \overline{U}_3$
$W_3 = (\overline{U}_1 + \overline{U}_2) \cdot U_3$
$W_4 = (U_4 + U_3) \cdot \overline{U}_5$
$W_5 = (\overline{U}_3 + \overline{U}_4) \cdot U_5$
$W_6 = (U_6 + U_5) \cdot \overline{U}_7$
$W_7 = (\overline{U}_5 + \overline{U}_6) \cdot U_7$ counter means for counting the number of bits in each second block in a given state to produce a count indicative of said quantitative effect ($\Delta E$);

threshold means defining a threshold value; and comparison means for comparing each count produced by said counting means and said threshold value.

5. The apparatus of claim 4 including means for generating a control signal CWN and wherein said logic means includes means for generating a block comprised of bits $V_0 - V_7$ where the position of each of bits $V_0–V_7$ corresponds in its block to the bit positions $U_0–U_7$ in said data array block respectively as defined by the following Boolean expressions:

$V_0 = CWN \cdot R_0 + \overline{CWN} \cdot U_0$
$V_1 = CWN \cdot R_1 + \overline{CWN} \cdot U_1$
$V_2 = CWN \cdot R_2 + \overline{CWN} \cdot U_2$
$V_3 = U_3$
$V_4 = U_4$
$V_5 = U_5$
$V_6 = U_6$
$V_7 = U_7$ where $R_0$, $R_1$, and $R_2$ represent bits of an array R of bits corresponding in position to bits $U_0$, $U_1$, and $U_2$ respectively in said data array.

6. The apparatus of claim 4 including means for generating a control signal CON and wherein said logic means includes means for generating bits $W_0–W_7$ as defined by the following Boolean expressions:

$W_{\phi} = (V_{\phi} + V_7) \cdot \overline{V}_1\ CON + \overline{CON} \cdot V_{\phi}$
$W_1 = (\overline{V}_7 + \overline{V}_0) \cdot V_1 \cdot CON + \overline{CON} \cdot V_1$
$W_2 = (V_2 + V_1) \cdot \overline{V}_3\ CON + \overline{CON} \cdot V_2$
$W_3 = (\overline{V}_1 + \overline{V}_2) \cdot V_3 \cdot CON + \overline{CON} \cdot V_3$
$W_4 = (V_4 + V_3) \cdot \overline{V}_5\ CON + \overline{CON} \cdot V_4$
$W_5 = (\overline{V}_3 + \overline{V}_4) \cdot V_5{}^{\cdot CON} + {}^{\overline{CON}} \cdot V_5$
$W_6 = (V_6 + V_5) \cdot {}^{V}{}_{7}\ CON + \overline{CON} \cdot V_6$
$W_7 = (\overline{V}_5 + \overline{V}_6) \cdot V_7 \cdot CON + \overline{CON} \cdot V_7$

7. The apparatus of claim 4 wherein said counter means includes nine output terminals and means for providing an enabling signal on the one of said nine output terminals corresponding to value of said count;

said threshold means including means defining a nine bit control signal; and wherein said comparison means includes logic means for comparing the signal on each of said nine output terminals with the corresponding bit of said nine bit control signal.

8. The apparatus of claim 4 wherein said comparison means includes means providing a single bit output signal P whose state is dependent on whether said count exceeds said threshold value; and means for logically combining said bit signal P and said bit in position $U_8$ to generate a result bit signal $R_8$.

9. The apparatus of claim 8 including means for generating a multibit control signal BSL; and wherein said means developing said signal $R_8$ defines different logical combinations of said bit signals P and $U_8$ in response to different states of said control signal BSL.

* * * * *